United States Patent
Hwang et al.

(10) Patent No.: US 11,197,135 B2
(45) Date of Patent: Dec. 7, 2021

(54) DEVICE AND METHOD FOR V2X COMMUNICATION

(71) Applicant: LG Electronics Inc., Seoul (KR)

(72) Inventors: Jaeho Hwang, Seoul (KR); Woosuk Ko, Seoul (KR)

(73) Assignee: LG Electronics Inc., Seoul (KR)

(*) Notice: Subject to any disclaimer, the term of this patent is extended or adjusted under 35 U.S.C. 154(b) by 135 days.

(21) Appl. No.: 16/499,752

(22) PCT Filed: Mar. 31, 2017

(86) PCT No.: PCT/KR2017/003581
§ 371 (c)(1),
(2) Date: Sep. 30, 2019

(87) PCT Pub. No.: WO2018/182074
PCT Pub. Date: Oct. 4, 2018

(65) Prior Publication Data
US 2020/0037127 A1    Jan. 30, 2020

(51) Int. Cl.
*H04W 4/40* (2018.01)
*B60W 30/18* (2012.01)
*B60W 50/00* (2006.01)

(52) U.S. Cl.
CPC ............ *H04W 4/40* (2018.02); *B60W 30/18* (2013.01); *B60W 50/00* (2013.01);
(Continued)

(58) Field of Classification Search
CPC .. B60W 30/18; B60W 50/00; B60W 2556/00; B60W 2556/45;
(Continued)

(56) References Cited

U.S. PATENT DOCUMENTS

| 6,275,759 B1 * | 8/2001 | Nakajima ........... F02N 11/0818 701/54 |
| 2007/0005609 A1 | 1/2007 | Breed |

(Continued)

FOREIGN PATENT DOCUMENTS

| CN | 102312743 | 1/2012 |
| JP | H11280516 | 10/1999 |

(Continued)

OTHER PUBLICATIONS

Extended European Search Report in European Appln. No. 17903201.6, dated Jul. 27, 2020, 9 pages.

(Continued)

*Primary Examiner* — Anthony R Jimenez
(74) *Attorney, Agent, or Firm* — Fish & Richardson P.C.

(57) ABSTRACT

Disclosed is a method of receiving a V2X message from a first V2X communication device by a second V2X communication device associated with a vehicle. The method of receiving a V2X message includes receiving a V2X message for providing information related to air pollution, determining whether the V2X message includes vehicle control information including information associated with at least one type of vehicle control, wherein the vehicle control information includes control mode information indicating a mode of the vehicle control, and controlling the vehicle on the basis of the control mode information if the V2X message includes the vehicle control information.

14 Claims, 30 Drawing Sheets

(52) U.S. Cl.
CPC . *B60W 2050/0096* (2013.01); *B60W 2556/00* (2020.02); *B60W 2556/45* (2020.02)

(58) Field of Classification Search
CPC ......... B60W 2050/0096; B60W 20/00; B60W 20/10; B60W 20/11; B60W 20/12; B60W 20/13; B60W 20/14; B60W 20/15; B60W 20/16; B60W 20/20; B60W 20/40; B60W 30/00; B60W 30/188; H04W 4/40; G08G 1/13; G08G 1/01; G08G 1/09; G08G 1/0969; G08G 1/0968; G08G 1/096833; G01C 21/00; B60H 1/00; B60H 1/24; F02D 2200/00; F02D 2200/702; F02N 11/00; F02N 11/08; F02N 11/0803; F02N 11/0814; F02N 11/0818; F02N 11/0837; Y10S 903/93; G05D 1/00; G05D 1/02; G05D 1/0227; G05D 1/0231; G05D 1/021; G05D 1/0217; G05D 3/00; G05D 2201/00; G05D 2201/02; G01R 31/382; G01R 31/371
USPC .............................................................. 701/2
See application file for complete search history.

(56) References Cited

U.S. PATENT DOCUMENTS

2012/0290149 A1* 11/2012 Kristinsson ........... B60W 20/12
701/2
2016/0214456 A1 7/2016 Maranville et al.

FOREIGN PATENT DOCUMENTS

| JP | 2001055938 | 2/2001 |
| JP | 2004204743 | 7/2004 |
| JP | 2009126246 | 6/2009 |
| JP | 2009223514 | 10/2009 |
| JP | 2009229397 | 10/2009 |
| KR | 1020150130009 | 11/2015 |
| KR | 1020160002095 | 1/2016 |
| WO | 2014153342 | 9/2014 |

OTHER PUBLICATIONS

Schlote et al., "Cooperative Regulation and Trading of Emissions Using Plug-in Hybrid Vehicles," IEEE Transactions on Intelligent Transportation Systems, Dec. 1, 2013, 14 pages.
PCT International Search Report in International Appln. No. PCT/KR2017/003581, dated Mar. 31, 2017, 24 pages (with English translation).
JP Office Action in Japanese Appln. No. 2019-553931, dated Mar. 2, 2021, 4 pages (with English translation).

* cited by examiner

FIG. 9

```
ASN.1 Representation:
  BasicSafetyMessage ::= SEQUENCE {
    -- Part I, Sent at all times with each message
    coreData       BSMcoreData, -- Part II, Content
    PartII         SEQUENCE (SIZE(1..8)) OF
                   PartIIcontent {{ BSMpartIIExtension }} OPTIONAL, regional       SEQUENCE (SIZE(1..4)) OF
                   RegionalExtension {{ REGION.Reg-BasicSafetyMessage }}
    ...
  }
```

Data Frame: DF_BSMcoreData

```
ASN.1 Representation:
  BasicSafetyMessage ::= SEQUENCE {
    msgCnt          MsgCount,
    id              TemporaryID,
    secMark         DSecond,
    lat             Latitude,
    long            Longition,
    elev            Elevation,
    accuracy        PositionalAccuracy,
    transmission    transmissionState,
    speed           Speed,
    heading         Heading,
    angle           SteeringWheelAngle,
    accelSet        AccelerationSet4Way,
    brakes          BrakeSystemStatus,
    size            VehicleSize,
  }
```

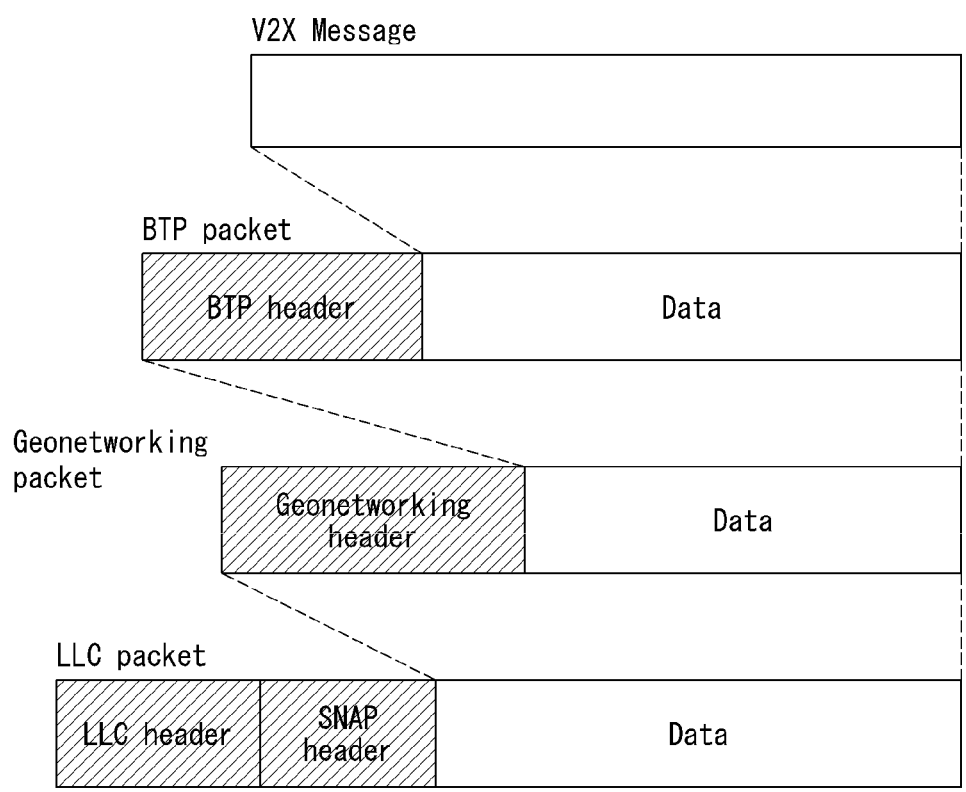

BTP-A (BTP-B)

Geonetworking packet

FIG. 16

```
ASN.1 Representation
  AirPollutionMessage    ::= SEQUENCE {
    msgId                DSRCmsgID                  -- in J2735
    stationId            TemporaryID,               -- in J2735
    stationPosition      Position3D                 -- in J2735
    stationType          StationType,     OPTION
    dataGenerationTime   DTime,                     -- in J2735
    msgGenerationTime    DTime,                     -- in J2735
    updateTime           DTime,           OPTION,
    warningFlag          APWarning        OPTION,
    currentAPData        APData
    historyAPData        APData           OPTION
    ...
  }
```

FIG. 17

| ASN.1 Representation |
|---|
| AirPollutionMessage ::= SEQUENCE {
    msgId                  DSRCmsgID                    -- in J2735
    stationId           TemporaryID,             -- in J2735
    stationPosition     Position3D              -- in J2735
    stationType         StationType,    OPTION
    dataGenerationTime  DTime,                -- in J2735
    msgGenerationTime   DTime,                -- in J2735
    updateTime          DTime,         OPTION,
    warningFlag         APWarning     OPTION,
    controlType         APControl
    currentAPData       APData
    historyAPData       APData        OPTION
    ...
} |

FIG. 18

| ASN.1 Representation |
|---|
| APControl   ::= SEQUENCE   {<br>   EcoDrivingMode        APControlMode<br>   EcoDrivingLifetime    DTime<br>   AutoStopMode          APControlMode<br>   AutoStopLifetime      DTime<br>   RecirculationMode     APControlMode<br>   RecirculationLifetime DTime<br>   ...<br>   } |

FIG. 19

| ASN.1 Representation |
|---|
| APControlMode          ::= ENUMERATED   {<br>    Release                 (0),<br>    OnRecommend             (1),<br>    OnMandatory             (2)<br>    ...<br>} |

DEVICE AND METHOD FOR V2X COMMUNICATION

CROSS-REFERENCE TO RELATED APPLICATIONS

This application is the National Stage filing under 35 U.S.C. 371 of International Application No. PCT/KR2017/003581, filed on Mar. 31, 2017, the contents of which are all hereby incorporated by reference herein in their entirety.

TECHNICAL FIELD

The present disclosure relates to a device and method for V2X communication, and particularly, to a method of transmitting and receiving a V2X message for V2X communication.

BACKGROUND ART

Nowadays, vehicles are being changed from a product of mechanical engineering to a product of complex industrial technology in which electrical, electronic, and communication technologies are converged and thus the vehicle is referred to as a smart car. The smart car connects a driver, a vehicle, and a traffic infrastructure to provide various user customized moving services as well as traditional vehicle technology such as a traffic safety/complex solution. Such connectivity may be implemented using Vehicle to Everything (V2X) communications technology.

DISCLOSURE

Technical Problem

Various services may be provided through V2X communication. Various services may be provided between a vehicle and an infrastructure or between a vehicle and the transportation vulnerable, as well as services between vehicles. Therefore, it is important to configure a V2X message for providing air pollution-related information or the like and transmit and receive the V2X message in each service environment.

Technical Solution

In order to solve the aforementioned problem, the present disclosure proposes a device and method for V2X communication.

In an aspect, a method of transmitting a V2X message by a first V2X communication device includes: generating a V2X message for providing information related to air pollution, wherein the V2X message includes vehicle control information including information associated with at least one type of vehicle control; and transmitting the V2X message to a second V2X communication device associated with a vehicle, wherein the type of vehicle control includes at least one of eco-driving control for controlling the vehicle to operate in an eco-driving mode, an auto-stop control for controlling the vehicle to operate in an auto-stop mode, or recirculation control for controlling the vehicle to operate in a recirculation mode.

In an embodiment, the vehicle control information may include control mode information indicating a mode of the vehicle control, and the control mode information may include at least one of eco-driving mode information indicating a mode of the eco-driving control, auto-stop mode information indicating a mode of the auto-stop control, or recirculation mode information indicating a mode of the recirculation control.

In an embodiment, if the control mode information is set to a first value, the control mode information may instruct to perform a release mode for corresponding vehicle control, if the control mode information is set to a second value, the control mode information may instruct to perform a recommended mode for the corresponding vehicle control, and if the control mode information is set to a third value, the control mode information may instruct to execute a mandatory mode for the corresponding vehicle control.

The vehicle control information may further include at least one of eco-driving lifetime information indicating a lifetime of the eco-driving control, auto-stop lifetime information indicating a lifetime of the auto-stop control, or recirculation lifetime information indicating a lifetime of the recirculation control.

In an embodiment, the method may further include: receiving air pollution information from an air pollution information management system, wherein the generating of the V2X message may include generating the V2X message on the basis of the air pollution information.

In another aspect, a first V2X communication device for transmitting a V2X message includes: a communication unit transmitting and receiving a communication signal; and a processor controlling the communication unit, wherein the processor is configured to generate a V2X message for providing information related to air pollution, wherein the V2X message includes vehicle control information including information associated with at least one type of vehicle control, and to transmit the V2X message to a second V2X communication device associated with a vehicle through the communication unit, wherein the type of vehicle control includes at least one of eco-driving control for controlling the vehicle to operate in an eco-driving mode, an auto-stop control for controlling the vehicle to operate in an auto-stop mode, or recirculation control for controlling the vehicle to operate in a recirculation mode.

In an embodiment, the vehicle control information may include control mode information indicating a mode of the vehicle control, and the control mode information may include at least one of eco-driving mode information indicating a mode of the eco-driving control, auto-stop mode information indicating a mode of the auto-stop control, or recirculation mode information indicating a mode of the recirculation control.

In an embodiment, if the control mode information is set to a first value, the control mode information may instruct to perform a release mode for corresponding vehicle control, if the control mode information is set to a second value, the control mode information may instruct to perform a recommended mode for the corresponding vehicle control, and if the control mode information is set to a third value, the control mode information may instruct to execute a mandatory mode for the corresponding vehicle control.

The vehicle control information may further include at least one of eco-driving lifetime information indicating a lifetime of the eco-driving control, auto-stop lifetime information indicating a lifetime of the auto-stop control, or recirculation lifetime information indicating a lifetime of the recirculation control.

In an embodiment, the processor may be configured to further receive air pollution information from an air pollution information management system, wherein the generating of the V2X message may include generating the V2X message on the basis of the air pollution information.

In another aspect, a method of receiving a V2X message from a first V2X communication device by a second V2X communication device associated with a vehicle, includes: receiving a V2X message for providing information related to air pollution; determining whether the V2X message includes vehicle control information including information associated with at least one type of vehicle control, wherein the vehicle control information includes control mode information indicating a mode of the vehicle control; and controlling the vehicle on the basis of the control mode information if the V2X message includes the vehicle control information.

In an embodiment, the controlling of the vehicle on the basis of the control mode information may include: performing a release mode for a corresponding vehicle control if the control mode information is a first value, performing a recommended mode for the corresponding vehicle control if the control mode information is a second value, and performing a mandatory mode for the corresponding vehicle control if the control mode information is a third value.

In an embodiment, the method may further include determining whether the vehicle is in an auto mode if the recommended mode is performed for the corresponding vehicle control, wherein the second V2X communication device performs an operation of the corresponding vehicle control if the vehicle is in the auto mode.

In an embodiment, the type of vehicle control includes at least one of eco-driving control for controlling the vehicle to operate in an eco-driving mode, an auto-stop control for controlling the vehicle to operate in an auto-stop mode, or recirculation control for controlling the vehicle to operate in a recirculation mode.

In an embodiment, the vehicle control information may further include at least one of eco-driving lifetime information indicating a lifetime of the eco-driving control, auto-stop lifetime information indicating a lifetime of the auto-stop control, or recirculation lifetime information indicating a lifetime of the recirculation control.

In another aspect, a second V2X communication device for receiving a V2X message from a first V2X communication device, the second V2X communication device being associated with a vehicle, includes: a communication unit transmitting and receiving a communication signal; and a processor controlling the communication unit, wherein the processor is configured to receive a V2X message for providing information related to air pollution; to determine whether the V2X message includes vehicle control information including information associated with at least one type of vehicle control, wherein the vehicle control information includes control mode information indicating a mode of the vehicle control; and to control the vehicle on the basis of the control mode information if the V2X message includes the vehicle control information.

In an embodiment, the controlling of the vehicle on the basis of the control mode information may include: performing a release mode for corresponding vehicle control if the control mode information is a first value, performing a recommended mode for the corresponding vehicle control if the control mode information is a second value, and performing a mandatory mode for the corresponding vehicle control if the control mode information is a third value.

In an embodiment, the second V2X communication device may further include: determining whether the vehicle is in an auto mode if the recommended mode is performed for the corresponding vehicle control, wherein the processor performs an operation of the corresponding vehicle control if the vehicle is in the auto mode.

In an embodiment, the type of vehicle control may include at least one of eco-driving control for controlling the vehicle to operate in an eco-driving mode, an auto-stop control for controlling the vehicle to operate in an auto-stop mode, or recirculation control for controlling the vehicle to operate in a recirculation mode.

In an embodiment, the vehicle control information may further include at least one of eco-driving lifetime information indicating a lifetime of the eco-driving control, auto-stop lifetime information indicating a lifetime of the auto-stop control, or recirculation lifetime information indicating a lifetime of the recirculation control.

Advantageous Effects

According to the present disclosure, the V2X communication device may communicate with an air pollution information management system. Through this, the air pollution information management system and an intelligent transport system (ITS) may be linked.

Furthermore, according to the present disclosure, the V2X communication device may transmit and receive a V2X message including information for controlling a vehicle in association with air pollution. Through this, the V2X communication device may control the vehicle associated with a nearby V2X communication device according to the degree of air pollution, rather than merely providing air pollution related information to the nearby V2X communication device.

DESCRIPTION OF DRAWINGS

The accompanying drawings, which are included to provide a further understanding of the invention and are incorporated in and constitute a part of this application, illustrate embodiments of the invention and, together with the description, serve to explain the principles of the invention.

FIG. 9 illustrates an example of a message in the V2X communication message set of FIG. 8.

FIG. 11(a) illustrates a method in which a V2X communication device processes a V2X message according to another embodiment of the present disclosure.

FIG. 16 shows an air pollution message according to an embodiment of the present disclosure.

FIG. 17 illustrates an air pollution message according to another embodiment of the present disclosure.

FIG. 18 shows air pollution control information according to an embodiment of the present disclosure.

FIG. 19 illustrates air pollution control mode information according to an embodiment of the present disclosure.

BEST MODE

Preferred embodiments of the present disclosure will be described in detail with reference to the accompanying drawings. The following detailed description with reference to the attached drawings is for the purpose of illustrating preferred embodiments of the present disclosure rather than illustrating only embodiments that may be implemented according to embodiments of the present disclosure. The following detailed description includes details in order to provide a thorough understanding of the present disclosure, but the present disclosure does not require all of these details. The present disclosure is not limited to separately use each of embodiments described hereinafter. Multiple embodiments or all of embodiments may be used together, and specific embodiments may be used as a combination.

Most of terms used in the present disclosure are selected from common ones widely used in the field, but some terms are arbitrarily selected by the applicant and a meaning thereof will be described in detail in the following description, as needed. Accordingly, the present disclosure should be understood based on an intended meaning of the term rather than a mere name or meaning of the term.

The present disclosure relates to a V2X communication device, and the V2X communication device may perform communication between a vehicle and a vehicle, a vehicle and an infrastructure, and a vehicle and a bicycle or a mobile device. The V2X communication device may be abbreviated to a V2X device. In an embodiment, the V2X communication device may be correspond to an on board unit (OBU) of a vehicle or may be included in the OBU. The V2X device may be correspond to a Road Side Unit (RSU) of an infrastructure or may be included in the RSU. Alternatively, the V2X communication device may be included in an Intelligent Transport System (ITS) station (or device) to perform all or some functions of the ITS station. Alternatively, the V2X communication device may perform all or some functions of a Wireless Access In Vehicular Environments (WAVE) station implemented using the WAVE station (or device).

Figure 1:
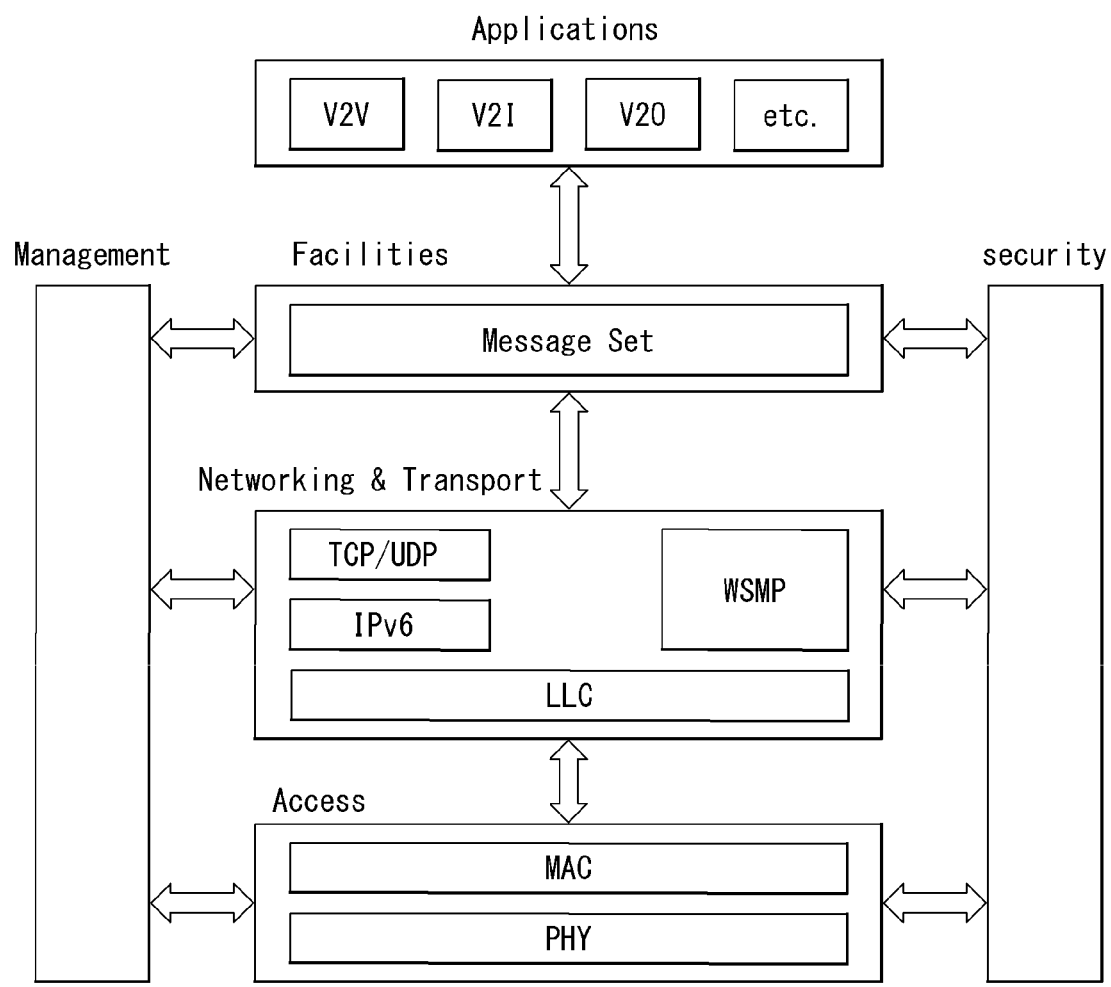
FIG. 1 illustrates an exemplary architecture of a V2X communication device according to an embodiment of the present disclosure.

FIG. 1 illustrates an exemplary architecture of a V2X communication device according to an embodiment of the present disclosure. FIG. 1 may be, for example, an exemplary architecture of a V2X communication device that may be implemented based on a reference architecture of an Intelligent Transport System (ITS) station (or device) according to the United States (US) standard. In an embodiment, the V2X communication device may be included in the ITS station to perform all or some functions of the ITS station. In an embodiment, an ITS station according to the US Standard may be implemented based on a WAVE station according to the IEEE802.11 and IEEE1609 standard.

In architecture of FIG. 1, a communication network between two end vehicles/users/infrastructures may be formed, and such communication may be performed through a function of each layer of the architecture of FIG. 1. For example, when a message is communicated between the infrastructure and the vehicle, in a transmission infrastructure (or vehicle) and a V2X communication device thereof, by passing through each layer downward by one layer, data may be transferred, and in a receiving vehicle (or infrastructure) and a V2X communication device thereof, by passing through each layer upward by one layer, data may be transferred. A description of each layer of an architecture of FIG. 1 is as follows.

Application layer: the application layer may implement and support various use cases or applications. For example, the application layer may provide various applications such as a Vehicle to Vehicle (V2V) application, a Vehicle to Infrastructure (V2I) application, and a Vehicle to others (V2O) application.

Facilities layers: the facilities layer may support to effectively realize various use cases defined in an application layer. In an embodiment, the facilities layer may perform a function of generating a message (or message set) based on information to be transmitted at an application layer, which is an upper layer.

Networking & Transport layer: The networking & transport layer may constitute a network for vehicle communication between homogenous/heterogenous networks by using various transport protocols and network protocols. For example, the networking & transport layer may provide Internet access and routing using an Internet protocol such as TCP/UDP+IPv6. Alternatively, the networking & transport layer may constitute a vehicle network using a Wave Short Message Protocol (WSMP).

Access layer: the access layer may transmit a message/data received from the upper layer through a physical channel. For example, the access layer may perform/support data communication based on IEEE 802.11 and/or 802.11p standard based communication technology, IEEE 1609 and/or IEEE 1609.4 standard based communication technology. The access layer has a characteristic similar or identical to an OSI 1 layer (physical layer) and an OSI 2 layer (data link layer).

An exemplary architecture of the V2X communication device may further include a management layer and a security layer.

Figure 2:
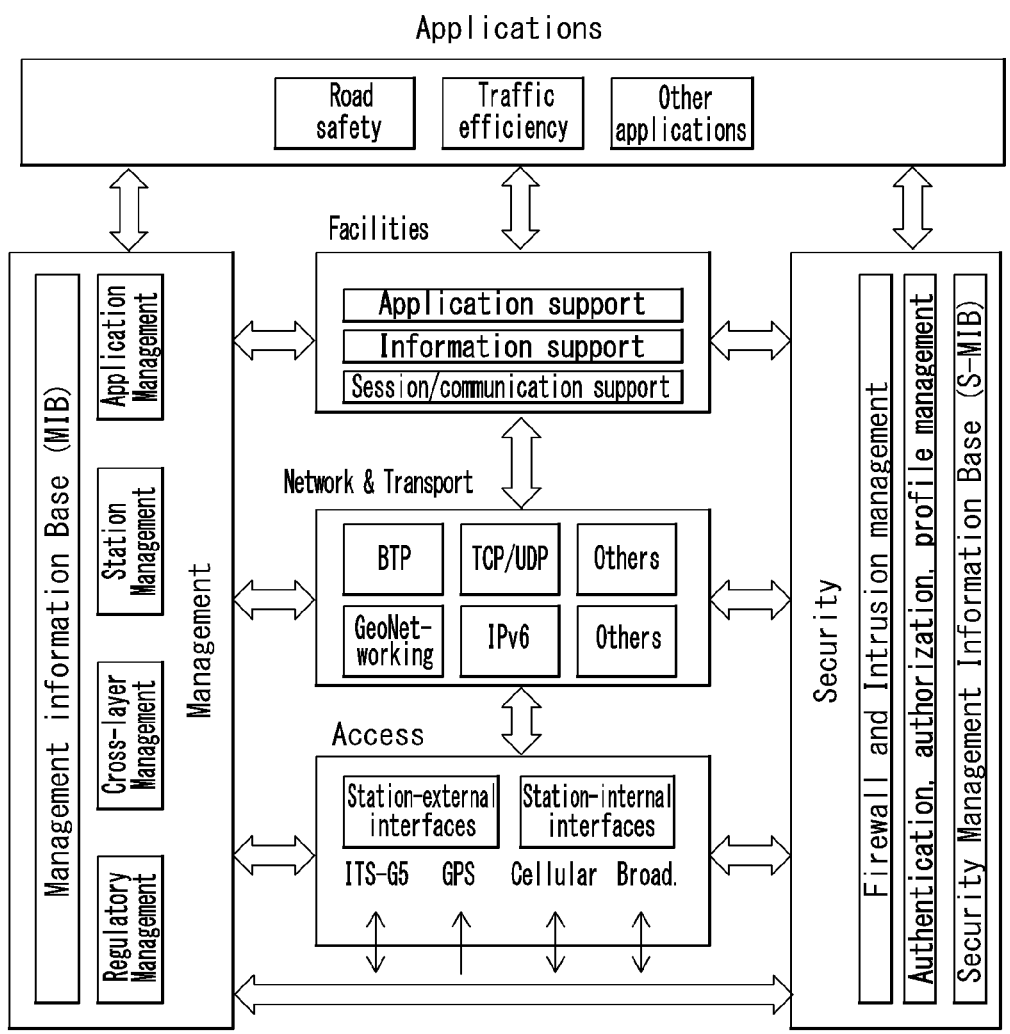
FIG. 2 illustrates an exemplary architecture of a V2X communication device according to another embodiment of the present disclosure.

FIG. 2 illustrates an exemplary architecture of a V2X communication device according to another embodiment of the present disclosure. FIG. 2 may be, for example, an exemplary architecture of a V2X communication device that may be implemented based on a reference architecture of an Intelligent Transport System (ITS) station (or device) according to the EU standard. In an embodiment, the V2X communication device may be included in the ITS station to perform all or some functions of the ITS station. Each layer of the architecture of FIG. 2 may have the same characteristics as or characteristics similar to each layer of a corresponding architecture of FIG. 1.

In the architecture of FIG. 2, as in the architecture of FIG. 1, communication between two end vehicles/users/communication infrastructures may be performed through functions of each layer of the architecture of FIG. 2. For example, when a message between vehicles is communicated, in a transmitting vehicle and a V2X communication device thereof, by passing through each layer downward by one layer, data may be transferred, and in a receiving vehicle and a V2X communication device thereof, by passing through each layer upward by one layer, data may be transferred. A description of each layer of the architecture of FIG. 2 is as follows.

Application layer: the application layer of FIG. 2 may have the same characteristics as or characteristics similar to those of the application layer of FIG. 1. For example, the application layer may implement and support various use cases as in provision of road safety, efficient traffic information, and other application information.

Facilities layers: the facilities layer of FIG. 2 may have the same characteristics as or characteristics similar to those of the facilities layer of FIG. 1. For example, the facilities layer may perform application support, information support, and session/communication support to support to effectively realize various use cases defined at the application layer.

Networking & Transport layer: the networking & transport layer of FIG. 2 may have the same characteristics or characteristics similar to those of the networking & transport layer of FIG. 1. For example, the networking & transport layer may provide Internet access and routing using an Internet protocol such as TCP/UDP+IPv6 to constitute a network for vehicle communication. Alternatively, the networking & transport layer may constitute a vehicle network using a geographical position based protocol such as Basic Transport Protocol (BTP)/Geonetworking.

Access layer: the access layer of FIG. 2 may have the same characteristics as or characteristics similar to those of the access layer of FIG. 1. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

An exemplary architecture of the V2X communication device of FIG. 2 may further include a management layer and a security layer, as in the exemplary architecture of the V2X communication device of FIG. 1.

Figure 3:
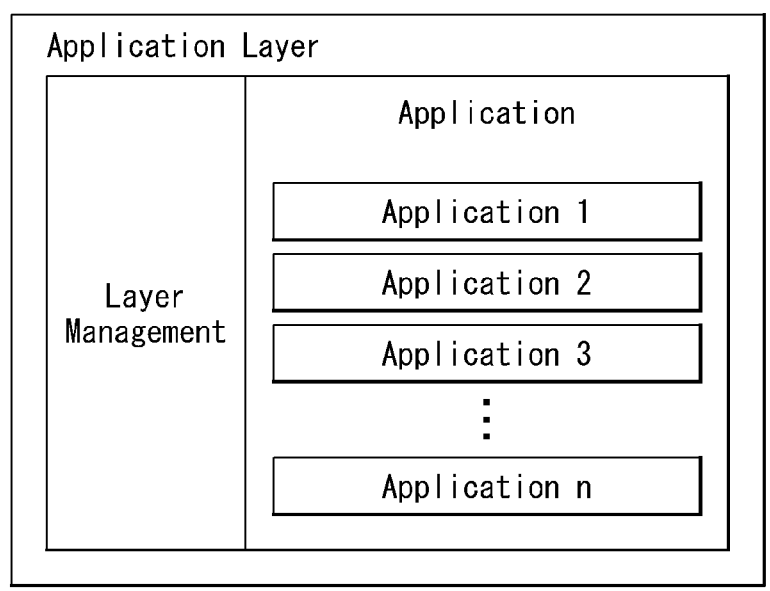
FIG. 3 illustrates an application layer of a V2X communication device according to an embodiment of the present disclosure.

FIG. 3 illustrates an application layer of a V2X communication device according to an embodiment of the present disclosure. FIG. 3 illustrates in detail an application layer of the V2X communication device of FIG. 1 or an application layer of the V2X communication device of FIG. 2.

The application layer classifies and defines an application and provides a service to an end vehicle/user/infrastructure through a facilities layer, a networking & transport layer, and an access layer, which are lower layers. In this case, the application may be classified and defined for each use case.

For example, the application may be classified and defined into a V2V application, a V2I application, a V2O application, and an I2O application. The V2V application is an application that provides a V2V service such as a vehicle security service and a driving support service using V2V technology, which is communication technology between vehicles. The V2I application is an application that provides a V2I service such as a vehicle safety service and a traffic information service using V2I technology, which is communication technology between a vehicle and an infrastructure. Here, the infrastructure may be a safety facility at a periphery of a road such as traffic light and street light. The V2O application is an application that provides a V2O service such as a vehicle safety service and a vulnerable road user protection service using V2O technology, which is communication technology between a vehicle and others. Here, other mean things, except for the vehicle and the infrastructure and may be, for example, a vulnerable road user such as a pedestrian. The I2O application is an application that provides an I2O service such as a vehicle safety service and a vulnerable road user protection service using I2O technology, which is communication technology between an infrastructure and others.

In another example, the application may be classified and defined into other applications such as a road-safety application, a traffic efficiency application, a local services application, and infotainment.

The aforementioned classification of the application is only an illustration, and the scope of the present disclosure is not limited to such classification. Further, such application classification and use case may be newly updated when a new application scenario occurs.

Layer Management performs a function of managing and servicing information related to an operation and security of an application layer, information and services are transferred and shared in two-way through an interface between management entity and application layer (MA) and an interface between security entity and applications (SA) (or SAP: Service Access Point, e.g., MA-SAP, SA-SAP). A request from the application layer to the facilities layer or information transfer from the facilities layer to the application layer is performed through an interface between facilities layer and ITS-S applications (FA) (or FA-SAP).

Figure 4:
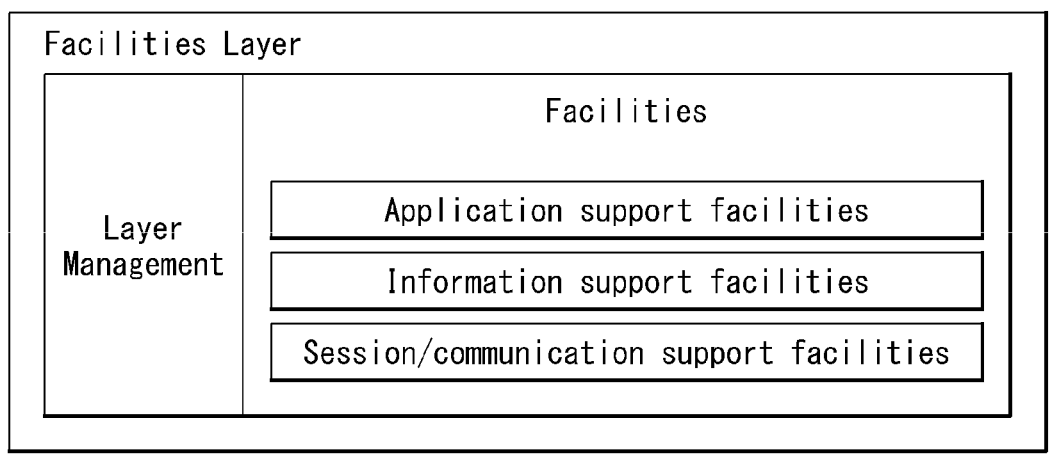
FIG. 4 illustrates a facilities layer of a V2X communication device according to an embodiment of the present disclosure.

FIG. 4 illustrates a facilities layer of a V2X communication device according to an embodiment of the present disclosure. FIG. 4 illustrates in more detail a facilities layer of the V2X communication device of FIG. 1 or a facilities layer of the V2X communication device of FIG. 2. The facilities layer of FIG. 4 has the same characteristics as and characteristics similar to those of an OSI 5 layer (session layer), an OSI 6 layer (presentation layer), and an OSI 7 layer (application layer). That is, the facilities layer basically supports the same function as or a function similar to that of three upper layers of an OSI model.

Further, the facilities layer additionally provides a facility for only the V2X communication device. For example, the facilities layer may provide a facility such as application support, information support, and session/communication support. Here, the facility means a component that provides functionality, information, and data.

A description of three exemplary suggested facilities is as follows.

An application support facility means a facility that supports a basic application set (or message set). In the V2X communication device of FIG. 1, the facilities layer may support, for example, a message such as a Wave short message (WSM). In the case of the V2X communication device FIG. 2, the facilities layer may support, for example, a periodic message such as Co-operative Awareness Messages (CAM) or an event message such as Decentralized Environmental Notification Messages (DENM).

The information support facility is a facility that provides common data information or database to be used for a basic application set (or message set) and may be, for example, a local dynamic map (LDM).

The session/communication support facility is a facility that provides a service for communication and session management and may be an addressing mode and session support.

Layer Management performs a function of managing and servicing information related to an operation and security of the facilities layer. Information and services are transferred and shared in two-way through an interface between management entity and facilities layer (MF) and an interface between security entity and facilities layer (SF) (or MF-SAP, SF-SAP). A request from the application layer to the facilities layer or information transfer from the facilities layer to the application layer is performed through FA (or FA-SAP), and two-way information and service transfer between the facilities layer and the networking & transport layer, which is a lower layer is performed by an interface between networking & transport layer and facilities layer (NF) (or NF-SAP).

As described above, the facilities layer performs support of an application set (or message) as one of major functions. That is, the facilities layer performs a function of generating a message set (or message) based on information to be transmitted or a service to be provided by the application layer. The generated message may be referred to as a V2X message and will be described in detail below with reference to FIG. 8.

Figure 5:
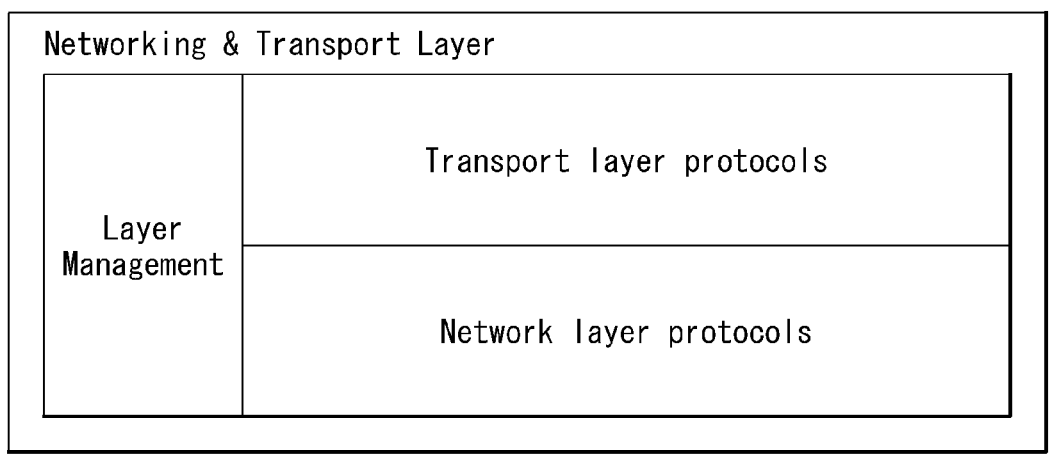
FIG. 5 illustrates a network/transport layer of a V2X communication device according to an embodiment of the present disclosure.

FIG. 5 illustrates a networking & transport layer of a V2X communication device according to an embodiment of the present disclosure. FIG. 5 illustrates in more detail a networking & transport layer of the V2X communication device of FIG. 1 and a networking & transport layer of the V2X communication device of FIG. 2. The networking & transport layer of FIG. 5 has the same characteristics as or characteristics similar to those of an OSI 3 layer (network layer) and an OSI 4 layer (transport layer).

The transport layer is a connection layer between services provided by an upper layer and a lower layer and performs a function of managing data transmitted by a user to accurately arrive at a destination. That is, the transport layer mainly performs a function of dividing data into a packet of an appropriate size to transmit for efficient data transmission at the transmission side and a function of recombining each packet of the received packets to an original file at the receiving side.

In the case of the V2X communication device of FIG. 1, for example, a TCP and a UDP used in an existing Internet network may be used as a transport protocol. In the case of the V2X communication device FIG. 2, for example, a BTP protocol for an ITS station or a TCP and a UDP used in an existing Internet network may be used as a transport protocol.

The network layer is responsible for a logical address, determines a transfer path of a packet, and performs a function of receiving a packet generated in the transport layer to add a logical address of a destination to a header of the network layer. As an example of packet route setting, unicast and broadcast between vehicles, between a vehicle and a fixed station, or between fixed stations may be considered.

In the case of the V2X communication device of FIG. 1, for example, an IP protocol (e.g., IPv6) used in the existing Internet network may be used as a network protocol. In the case of the V2X communication device of FIG. 2, for example, GeoNetworking for an ITS station, and an IP protocol (IPv6 networking with mobility support, IPv6 over GeoNetworking) used in the existing Internet network may be used as a network protocol.

In the above embodiment, the networking & transport layer provides a function of each of a network layer and a transport layer using a separate network protocol and transport layer, but the networking & transport layer may provide a function of a network layer and a transport layer using a single protocol. For example, in the case of the V2X communication device of FIG. 1, the networking & transport layer may provide a function of a networking & transport layer using a Wave Short Message Protocol (WSMP) protocol for a WAVE station. Here, the WSMP protocol is a networking & transport protocol for transmitting a WAVE Short Message (WSM) generated in a facilities layer of a WAVE system to a lower layer.

Layer management performs a function of managing and servicing information related to an operation and security of the networking & transport layer. Information and services are transferred and shared in two-way through an interface between management entity and networking & transport layer (MN) (or MN-SAP) and an interface between security entity and networking & transport layer (SN) (or SN-SAP). Two-way information and service transfer between the facilities layer and the networking & transport layer is performed by an NF (or NF-SAP), and information exchange between the networking & transport layer and the access layer is performed by an interface between access layer and networking & transport layer (IN) (or IN-SAP).

Figure 6:
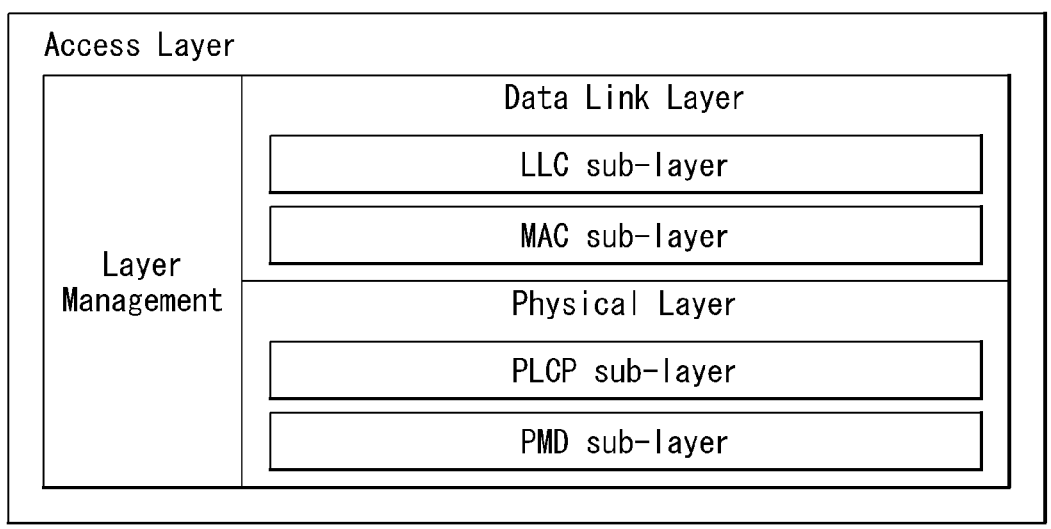
FIG. 6 illustrates an access layer of a V2X communication device according to an embodiment of the present disclosure.

FIG. 6 illustrates an access layer of a V2X communication device according to an embodiment of the present disclosure.

FIG. 6 illustrates in more detail an access layer of the V2X communication device of FIG. 1 or an access layer of the V2X communication device of FIG. 2. The access layer of FIG. 3 may include a data link layer, a physical layer, and layer management. The access layer of FIG. 3 has the same characteristics as or characteristics similar to those of an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

The data link layer may convert a physical line between adjacent nodes (or between vehicles) having noise into a communication channel having no transmission error so that an upper network layer may use the physical line. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, in order to avoid from erroneously confusing packets or ACK signals, the data link layer performs a function of giving a sequence number to the packet and the ACK signal and a function of controlling setup, maintenance, and short-circuit of a data link between network entities and data transmission. Furthermore, such data link layer may include a logical link control (LLC) sub-layer and a medium access control (MAC) sub-layer based on the IEEE 802 standard.

A main function of the LLC sub-layer is to allow communication unrelated to topology of a network by enabling to use several different lower MAC sub-layer protocols. According to an embodiment, the LLC sub-layer may be included in the networking & transport layer as shown in FIG. 1.

The MAC sub-layer may control collision/contention occurrence between vehicles when several vehicles (or nodes or vehicles and peripheral devices) use a shared medium. The MAC sub-layer may format packets transferred from an upper layer to correspond to a frame format of a physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying (busy or idle) whether a wireless medium is being used through carrier sense and clear channel assessment (CCA) to a MAC sub-layer. Furthermore, such a physical layer may include a physical layer convergence protocol (PLCP) sub-layer and a physical medium access (PMD) sub-layer based on the IEEE standards.

The PLCP sub-layer performs a function of connecting an MAC sub-layer and a data frame. The PLCP sub-layer adds a header to reception data to enable the MAC sub-layer to operate regardless of a physical characteristic. Therefore, the PLCP frame may define differently a format thereof according to several different wireless LAN physical layer standards.

A main function of the PMD sub-layer may perform carrier modulation or RF modulation of a frame received from the PLCP sub-layer and then transmit the frame to the wireless medium according to transmission and reception related standards.

Layer management performs a function of managing and servicing information related to an operation and security of an access layer. Information and services are transferred and shared in two-way through an interface between management entity and access layer (MI) (or MI-SAP) and an interface between security entity and access layer (SI) (or SI-SAP). Two-way information and service transfer between the access layer and the networking & transport layer is performed by an IN (or IN-SAP).

Figure 7:
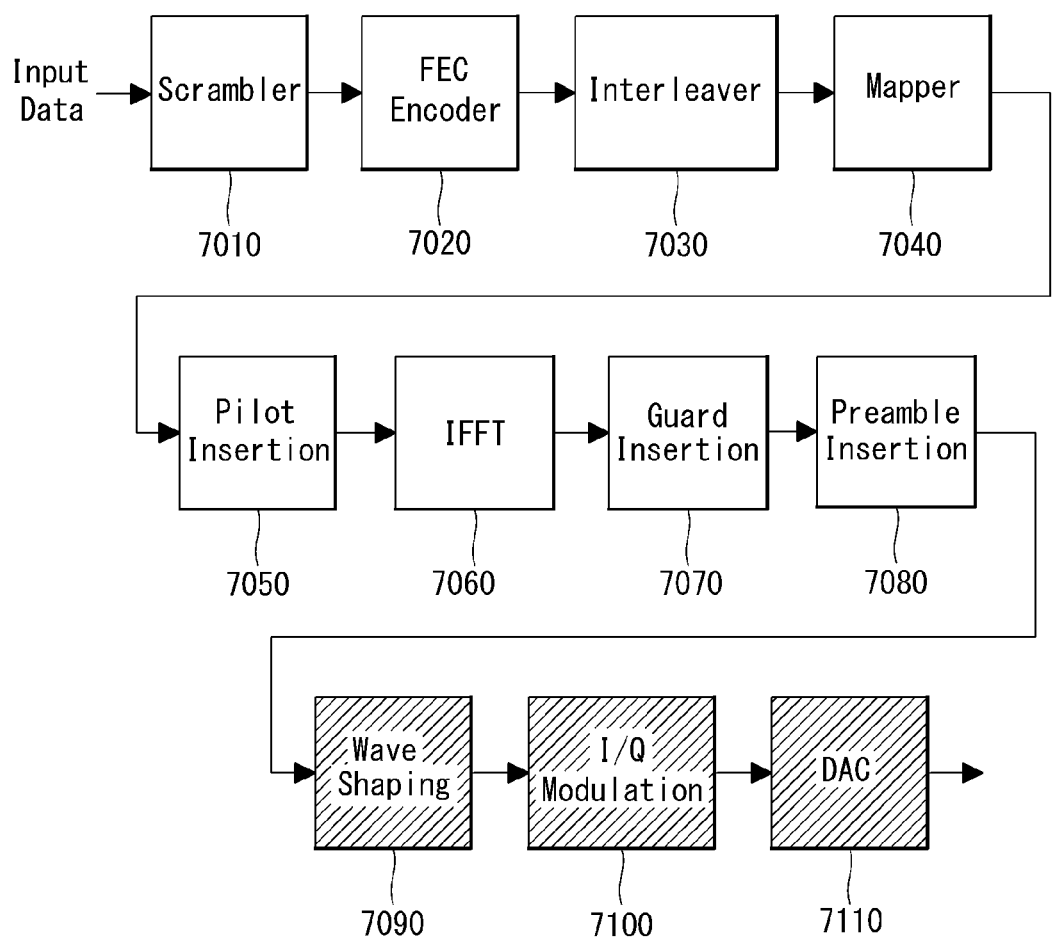
FIG. 7 illustrates a physical layer configuration of a V2X communication device according to an embodiment of the present disclosure.

FIG. 7 illustrates a physical layer configuration of a V2X communication device according to an embodiment of the present disclosure.

In an embodiment, FIG. 7 is a block diagram illustrating physical layer signal processing of the IEEE 802.11 or ITS-G5. However, FIG. 7 illustrates a physical layer configuration according to an embodiment of the present disclosure, and the physical layer configuration is not limited only to the above-described transmission standard technology.

A physical layer processor of FIG. 7 may include a Physical Layer Convergence Protocol (PLCP) sub-layer baseband signal processing part including at least one of a scrambler 7010, an FEC encoder 7020, an interleaver 7030, a mapper 7040, a pilot insertion 7050, an IFFT 7060, a guard insertion 7070, and a preamble insertion 7080 and a Physical Medimu Dependant (PMD) sub-layer RF band signal processing part including at least one of a wave shaping 7090, an I/Q modulation 7100, and a DAC 7110. A function description of each block is as follows.

The scrambler 7010 may perform an XOR operation of input bit stream with a Pseudo Random Binary Sequence (PRBS) to randomize the input bit stream. The FEC encoder 5020 may add redundancy to transmission data so that the reception side corrects an error on a transmission channel. In order to correspond to a burst error, the interleaver 7030 may interleave input data/bit string based on the interleaving rule. In an embodiment, when deep fading or erasure is applied to a QAM symbol, interleaved bits are mapped to each QAM symbol and thus an error may be prevented from occurring in continuous bits of the entire code word bits. The mapper 7040 may allocate the inputted bit word to single constellation. The pilot insertion 7050 inserts a reference signal into a predetermined position of a signal block. When using such a reference signal, the receiver may estimate a channel distortion phenomenon such as channel estimation, frequency offset, and timing offset.

The IFFT 7060, i.e., the inverse waveform transform block may convert an input signal so that transmission efficiency and flexibility is enhanced in consideration of a system structure and characteristics of a transmission channel. In an embodiment, in the case of the OFDM system, the IFFT 7060 may convert a signal of a frequency domain to a signal of a time domain using an inverse FFT operation. The IFFT 7060 may not be used or omitted in the case of a single carrier system. In order to minimize an influence of delay spread of a transmission channel, the guard insertion 7070 may insert a guard interval between adjacent signal blocks. In an embodiment, in the case of the OFDM system, the guard insertion 7070 may insert a cyclic prefix into a guard interval segment. In order to enable a receiver to quickly and efficiently detect a target signal, the preamble insertion 7080 may insert a signal of the determined type, i.e., a preamble into a transmission signal during a transmission and reception period. In the embodiment, in the OFDM system, the preamble insertion 7080 may define a signal block/signal frame including a plurality of OFDM symbols and insert a preamble symbol into a start portion of the signal block/signal frame.

The wave shaping 7090 may perform waveform processing of an input baseband signal based on channel transmission characteristics. In an embodiment, in order to obtain a reference of out-of-band emission of a transmitted signal, the waveform shaping 7090 may perform square-root-raised cosine (SRRC) filtering. In the case of a multi-carrier system, the waveform shaping block 5090 may not be used or omitted. The I/Q modulator 7100 may perform in-phase and quadrature modulation. The Digital to Analog Converter (DAC) 7110 may convert and output an input digital signal to an analog signal. An output analog signal may be transmitted through an output antenna.

Each of the blocks illustrated and described in FIG. 7 may be omitted or replaced by another block having a similar or identical function. Blocks of FIG. 7 may be configured with all or some combinations, as needed.

Figure 8:
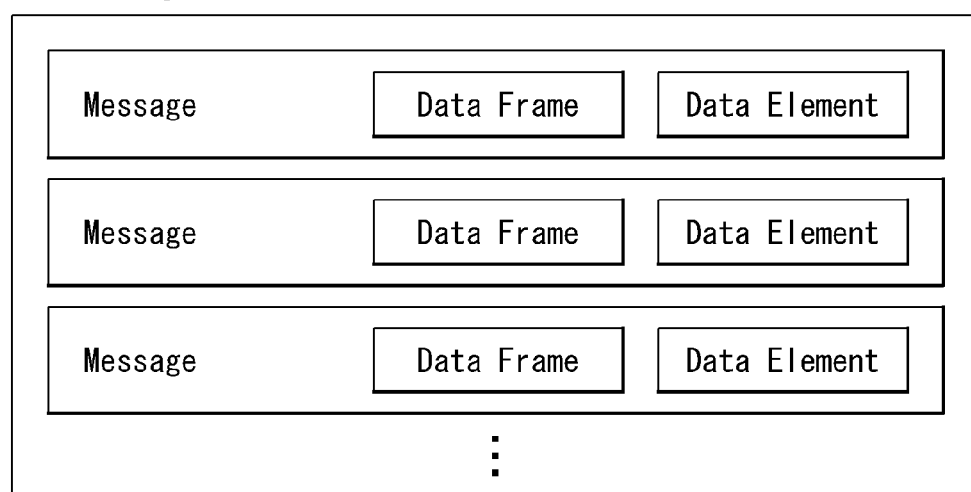
FIG. 8 illustrates a V2X communication message set according to an embodiment of the present disclosure.

FIG. 8 illustrates a V2X communication message set according to an embodiment of the present disclosure. The message set of the embodiment of FIG. 8 may be a message set generated in the facility layer of the above-described V2X device. In this disclosure, the message set may be referred to as a V2X message set or an application set.

As shown in FIG. 8, the message set (or V2X message set) may include at least one message (or V2X message). In an embodiment, each message may be configured with a data frame and/or a data element. The concept of each thereof is described as follows.

Message set: the message set is a collection of messages related to an operation of the V2X device. For example, the V2X message set may be a collection of messages such as a message defined in the Society of Automotive Engineers (SAE) J2735 standard, for example, a BasicSafetyMessage (BSM), a RoadSideAlert, and a PersonalSafetyMessage.

The message: the message is a set of data elements and data frames that may be transmitted in a single unit between the V2X devices. For example, the V2X message may be a BSM message in a message set defined in the J2735 standard. In another example, the V2X message may be Cooperative Awareness Messages (CAM) or Decentralized Environmental Notification Messages (DENM) defined in the ETSI EN-302-637 Standard.

Data frame: the data frame is one of message configurations and refers to an array of at least two data. In an embodiment, the data frame may be a list of data elements and/or a list of a data frame. For example, the data frame may be BSMcoreData representing core data always included in the above BSM message. The BSM core data may be represented with a list of data elements.

Data element: the data element is one of message configurations and represents an expression of single information. That is, the data element provides a description of interested information of a minimum unit. For example, the data element may be speed data representing a speed of a vehicle in the above-mentioned core data. The data element is regarded as an indivisible element. In other words, the data elements cannot be a list of other data elements or data frames.

In an embodiment, a V2X message or a message set including the same may be represented based on an Abstract Syntax Notation One (ASN.1) method. The ASN.1 method is used for describing a data structure and also specifies encoding/decoding rule of data. The ASN.1 method corresponds to the Consultative Committee on International Telegraphy and Telephony X.208 (CCITT) and international Organization for Standardization (ISO 8824) common standard. The ASN.1 method has a characteristic that is not dependent on a specific device, a data representation method, a programming language, and a hardware platform. That is, ASN.1 corresponds to a language for describing data regardless of a platform. Therefore, when the V2X message is represented based on ASN.1, V2X devices operating different platforms have the advantage that communication of a V2X message is available. Hereinafter, an example of the V2X message described with the ASN.1 method will be described with reference to FIG. 9.

FIG. 9 illustrates an example of a message in the V2X communication message set of FIG. 8. In particular, FIG. 9 illustrates an example of a V2X message in a V2X message set. In the embodiment of FIG. 9, the V2X message may be a vehicle safety related message, for example, a BSM message defined in the SAE J2735 standard. The BSM message is a most basically used message of messages defined in the SAE J2735 standard and is a message that provides vehicle safety related information. Such a BSM message may be used in various applications for exchanging security data related to a vehicle status. In this disclosure, the BSM message may be referred to as a safety message or a vehicle safety message.

As shown in FIG. 9, the BSM message may be represented based on an Abstract Syntax Notation One (ASN.1) method. Further, the BSM message may be configured with at least one data part (or data container). For example, the BSM message may include a first data part and/or a second data part. The first data part indicates a part (or container) including core data always transmitted in all BSM messages, and the second data part indicates a part (or container) including data optionally included in the BSM message. In this disclosure, the first data part may be referred to as a first part, a main part, a common part, and a core part. Further, the second data part may be referred to as a second part, a sub-part, a specific part, and a non-core part.

In an embodiment, a core data included in the first data part is a data frame and may be configured with a plurality of data elements such as a plurality of data IDs, latitudes (lat), longitudes (long), speeds, and sizes. Thereby, basic information of a vehicle such as ID, latitude, longitude, speed, and a size of the vehicle may be provided. In an embodiment, in order to periodically provide basic information of the vehicle to a peripheral device, the V2X device may periodically transmit (or broadcast) a BSM message. For example, the V2X device may transmit the BSM message in a cycle of 100 msec, i.e., a cycle of 10 times per second.

The above BSM message is mainly used as a V2V message for providing vehicle safety related information between vehicles, but the present disclosure is not limited thereto and may be used as, for example, a V2I message or a V2O message for providing vehicle safety related information between a vehicle and an infrastructure or between a vehicle and others. Further, in the above embodiments, only a message structure and characteristics of the BSM message have been described, but the same description as or a description similar thereto may be applied to other V2X messages. For example, the V2I message may have the same structure as the message structure of the above-described BSM message. For example, the V2I message may include the first data part (or container) and the second data part (or container).

FIG. 10(*a*) illustrates a method in which a V2X communication device processes a V2X message according to an embodiment of the present disclosure. In particular, the embodiment of FIG. 10(*a*) illustrates a method in which the V2X communication device of FIG. 1 processes a V2X message for transmission and reception of a V2X message. Further, FIG. 10(*b*) illustrates an exemplary structure of a WSM message processed by the processing method of FIG. 10(*a*), and FIG. 10(*c*) illustrates an exemplary structure of an LLC packet processed by the processing method of FIG. 10(*a*).

The V2X communication device may generate a V2X message (or V2X message set) through facility layer processing. In an embodiment, the V2X communication device may generate a V2X message through facility layer processing based on information (or upper layer information) received from the application layer. In this case, the V2X communication device may generate a V2X message of a predefined format. For example, the V2X communication device may generate a V2X message using a message dictionary defined in the SAE J2735 standard. In this case, the generated V2X message may have, for example, a message format of FIG. 9. As described above, the V2X messages may include a V2V message for communication between vehicles, a V2I message for communication between a vehicle and an infrastructure, and/or a V2O message for communication between a vehicle and others.

Figure 10A:
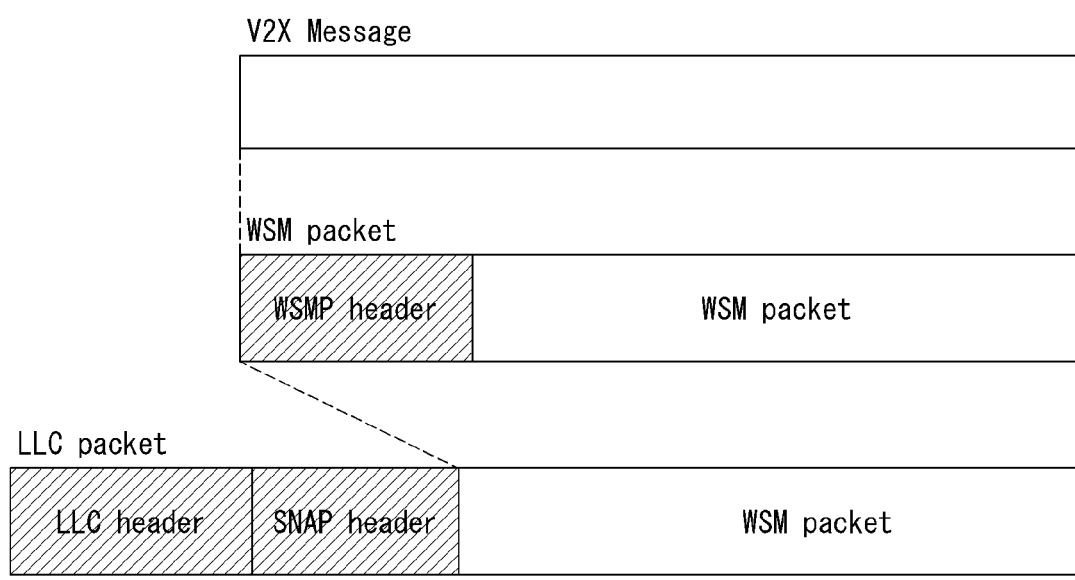
FIG. 10(*a*) illustrates a method in which a V2X communication device processes a V2X message according to an embodiment of the present disclosure.
FIG. 10(b) illustrates an exemplary structure of a WSM message processed by the processing method of FIG. 10(a)
FIG. 10(c) illustrates an exemplary structure of an LLC packet processed by the processing method of FIG. 10(a).

Next, the V2X communication device may perform network/transport layer processing on the V2X message. In an embodiment, the V2X communication device may process the V2X message on the basis of the WSMP protocol to generate a WSM packet. The generated WSM packet may include a data part including a V2X message and a header part (or WSMP header) as shown in FIG. 10(a). In this disclosure, data included in the data part of the WSM packet may be referred to as WSM data. In addition, the header of the WSM packet may be referred to as a WSMP header. The WSM packet may also be referred to as a WSM message.

Figure 10B:
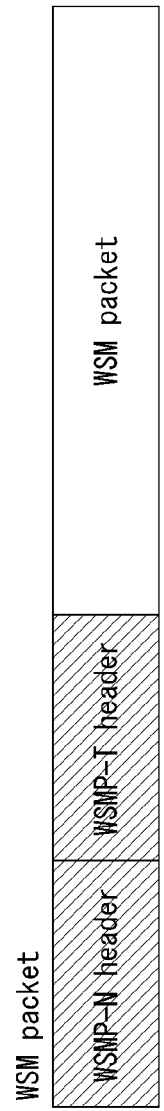

Referring to FIG. 10(b), the header part of the WSM packet may include a WSMP-N (network) header responsible for a network layer and a WSMP-T (transport) header responsible for a transport layer.

In an embodiment, the WSMP-N header may include at least one of a subtype field, an option indicator, a version field, a WAVE information element extension field, or a TPID field. Description of each field is as follows.

The subtype field is a 4-bit field and may indicate a type of a network protocol. In an embodiment, when the subtype field is a first value (e.g., '0'), the subtype field may indicate a 'null-networking protocol', that is, indicating that a network layer protocol is not used. Alternatively, when the subtype field is the second value (e.g., '1'), the subtype field may indicate that the type of the network protocol is the 'ITS station internal forwarding' protocol. Alternatively, when the subtype field is a third value (e.g., '2'), the subtype field may indicate that the type of the network protocol is 'N-hop forwarding' protocol. Alternatively, when the subtype field is a third value (e.g., '3'), the subtype field may indicate that the type of the network protocol is a 'GeoNetworking' protocol. Other values may be reserved for future use.

The optional indicator field is a 1-bit field and may indicate the presence or absence of a subsequent WAVE information element extension field. In the present disclosure, the option indicator field may be referred to as a WSMP-N option indicator field.

The version field indicates a version of the WSM protocol (WSMP). In an embodiment, the version field may be a 3-bit field.

The TPID field is a 1-byte field and may indicate an ID of a transport protocol. The TPID field may be used to indicate a protocol type of the WSMP-T header.

A structure of the WSMP-T header may be determined by the TPID field.

For example, when TPID=0, a provider service ID (PSID) may be used as address information, the WAVE information element extension field may not exist, and a WSM length field may represent a length of a WSM packet or WSM data.

In another example, when TPID=1, the PSID may be used as address information, the WAVE information element extension field may not exist, and the WSM length field may indicate a length of the WSM packet or WSM data.

In another example, when TPID=3, 2-byte "source ITS port number" may be used as address information, 2-byte "destination ITS port number" may be subsequently used, the WAVE information element extension field may exist, and the WSM length field may indicate the length of the WSM packet or WSM data.

Next, the V2X communication device may perform LLC layer processing of a V2X message. In an embodiment, the V2X communication device processes a WSM packet (or WSM message) based on an LLC layer protocol to generate an LLC packet. The LLC packet generated in this way may include a data part and a header part including a WSM packet, as shown in FIG. 10(a). In an embodiment, the header part of the LLC packet may include an LLC header and/or a Subnetwork Access Protocol (SNAP) header. In an embodiment, the SNAP header may be an optional header. In this disclosure, an entire header including an LLC header and an SNAP header may be referred to as an LLC packet header.

Figure 10C:
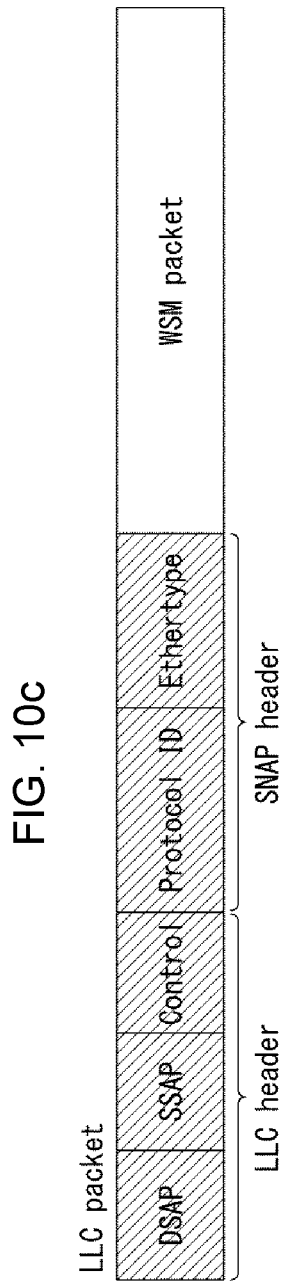

Referring to FIG. 10(c), the LLC header may include a Destination SAP (DSAP) field, a Source SAP (SSAP) field and/or a control field. Further, the SNAP header may include a protocol ID field and/or an Ethertype field. A description of each field is as follows.

The DSAP field provides information on a SAP of a destination, and the SSAP provides information on a SAP of a source. In an embodiment, the DSAP field and the SSAP field each are a field of 1 byte and may be used as a value for distinguishing an upper layer protocol.

Because the DSAP field and the SSAP field each have a length of 1 byte, it is difficult to distinguish a large number of upper layer protocols with only the two fields. Therefore, an SNAP header may further be used as additional information. When an SNAP header is included in an LLC packet header, a value of the DSAP field and the SSAP field may be set to a specific first value (0xAA). In this case, a first value of the DSAP field and the SSAP field indicates that the SNAP field is used.

The control field is a field of 1 byte and represents a type of an LLC packet.

The protocol ID field is a field of 3 bytes and represents an ID of an upper layer protocol. An Ethertype field is a field of 2 bytes and represents a type of an upper layer protocol. Such a protocol ID field and Ethertype field may be used for distinguishing an upper layer protocol.

In an embodiment, an Ethertype field within an SNAP header may provide information for distinguishing IP data and WSMP data.

At the transmitter side, the V2X communication device may set an Ethertype field to a first value (e.g., 0x88DD) and send down an IP packet to an IP data path when transmitting IP data including a V2X message. Alternatively, when transmitting WSMP data including a V2X message, the V2X communication device may set an Ethertype field to a second value (e.g., 0x86DC) different from a first value and send down a WSM packet to a WSMP path. Thereby, the V2X communication device may divide and transmit IP data and WSMP data. Here, the IP path means a path according to an UPT (or TCP)/IP protocol, and the WSMP path means a path according to a WSMP protocol.

At the receiver side, the V2X communication device parses an LLC packet to determine a value of the Ethertype field, and when a value of the Ethertype field is a first value, the V2X communication device may send up an IP packet to an IP packet path, and when a value of the Ethertype field is a second value, the V2X communication device may send up a WSM packet to a WSMP path.

Next, the V2X communication device may perform MAC layer processing of a V2X message. In an embodiment, the V2X communication device may process an LLC packet based on the MAC layer protocol to generate an MAC packet. The generated MAC packet (or MAC protocol data unit (PDU)) may include an MAC header part, an MAC trailer part and/or a data part (or MAC service data unit (SDU)). In an embodiment, the MAC trailer part may include a frame check sequence (FCS) field.

Next, the V2X communication device may perform physical layer processing of a V2X message. In an embodiment, the V2X communication device may process an MAC packet based on a physical layer protocol to generate a signal frame. Further, the V2X communication device may transmit a communication signal including a signal frame. Thereby, the V2X message may be transmitted to the V2X communication device of the receiver side. Such physical layer processing is the same as that described with reference to FIG. 7. In this disclosure, the signal frame may be referred to as a message frame or a V2X message frame.

The V2X communication device of the receiver side may perform a reverse process of the above-described process to obtain a V2X message. The V2X communication device may receive a communication signal including a signal frame. The V2X communication device may parse a signal frame through physical layer parsing to obtain an MAC packet, obtain an LLC packet through MAC layer parsing, obtain a WSM packet or an IP packet through LLC layer parsing, and obtain a V2X message through network/transport layer parsing. The V2X communication device of the receiver side may provide an application service using the obtained V2X message.

In the above-described embodiment, in an embodiment in which a V2X packet of a WSM message format is generated and is processed based on the WSM protocol, i.e., is processed in a WSMP data path, a processing process of the V2X message has been described, but the scope of the present disclosure is not limited to the above-described embodiment. For example, a V2X message of an IP data format may be generated, and in this case, the V2X message may be processed according to an IP data path.

Further, in the above embodiment, an embodiment has been described in which the V2X communication device processes a single message for transmission and reception of a message unit, but the same description or a similar description may be applied to an embodiment of processing a message set for transmission and reception of a message set unit. The above-described processing process of the V2X message may be performed by at least one processor included in the V2X communication device.

Figure 11B:
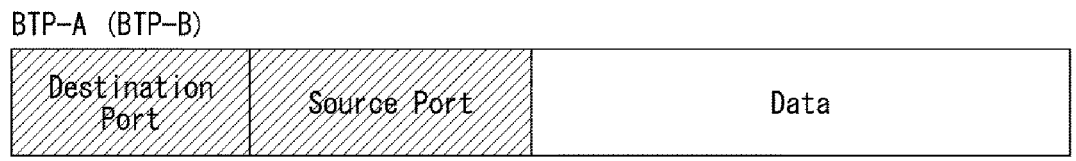
FIG. 11(b) illustrates an exemplary structure of a BTP packet processed by the processing method of FIG. 11(a)
Figure 11C:
FIG. 11(c) illustrates an exemplary structure of a geonetworking packet processed by the processing method of FIG. 11(a).

FIG. 11 illustrates a method in which a V2X communication device processes a V2X message according to another embodiment of the present disclosure. In particular, an embodiment of FIG. 11(b) illustrates a method in which the V2X communication device of FIG. 2 processes a V2X message for transmission and reception of a V2X message. Further, FIG. 11(b) illustrates an exemplary structure of a BTP packet processed by the processing method of FIG. 11(a), and FIG. 11(c) illustrates an exemplary structure of a geonetworking packet processed by the processing method of FIG. 11(a). As described above, each layer of the V2X communication device of FIG. 2 may perform the same function as or a function similar to that of each layer corresponding to the V2X communication device of FIG. 1. Therefore, in FIG. 11, a description corresponding to that of the embodiment of FIG. 10 is omitted.

The V2X communication device may generate a V2X message (or V2X message set) through facility layer processing. In this case, the V2X communication device may generate a V2X message of a predefined format. The generated V2X messages may have a periodic message format such as Co-operative Awareness Messages (CAM) or an event message format such as Decentralized Environmental Notification Messages (DENM). Here, the event message indicates a message triggered by detection of an event to be transmitted.

Next, the V2X communication device may perform network/transport layer processing of a V2X message. First, the V2X communication device may process a V2X message based on a BTP protocol to generate a BTP packet. The generated BTP packet may include a data part and a header part including a V2X message, as shown in FIG. 11(a).

Referring to FIG. 11(b), the header part of the BTP packet may include a destination port field and/or a transmission position port field. A description of each field is as follows.

The destination port field indicates a port of a protocol entity in a facility layer of a destination of a BTP packet. The transmission position port field (or source port field) indicates a port of a protocol entity in a facility layer of a source of a BTP packet.

Next, the V2X communication device may process a V2X message based on a geonetworking protocol to generate a geonetworking packet. The generated geonetworking packet may include a data part and/or a header part including a V2X message, as shown in FIG. 11(a). In this disclosure, the header part of the geonetworking packet may be referred to as a geonetworking header.

Referring to FIG. 11(c), the header part of the geonetworking packet may include a basic header, a common header and/or an extension header. In an embodiment, the extension header may be an optional header.

In an embodiment, the basic header may include a version field, a next header (NH) field, a lifetime (LT) field, and/or a reserved field.

The version field is a field of 4 bits and represents a version of a geonetworking protocol. The NH field is a field of 4 bits and represents a type of a header located immediately after the basic header. The LT field is a field of 1 byte and represents a maximum tolerable time that may be buffered until a geonetworking packet arrives at a destination. The reserved field is a field of 1 byte and is a field reserved for future use.

In an embodiment, the common header may include a NH field, a header type (HT) field, a header sub-type (HST) field, a traffic class (TC) field, a flags field, a payload length (PL) field, a maximum hop limit (MHL) field and/or a reserved field.

The NH field is a field of 4 bits and represents a type of a header located immediately after the geonetworking header. The HT field is a field of 4 bits and represents a type of a geonetworking header. The HST field is a field of 4 bits and represents a sub-type of the geonetworking header. The TC field represents a traffic class representing facility layer requirement for packet transmission. The flag field is a field of 1 byte, and a 0th bit indicates whether an ITS station (or V2X communication device) is mobile or stationary, and bits from a first bit to a seventh bit may be reserved for future use. The PL field is a field of 2 bytes and represents a length of a data part (or payload) of the geonetworking packet. The MHL field is a field of 1 byte and represents the maximum hop limit. The reserved field is a field of 1 byte and is a field reserved for future use. In an embodiment, the extension header is an optional header and may include at least one additional field according to a geonetworking mode. The geonetworking mode may include, for example, a broadcasting mode, an anycasting mode, and a unicasting mode. In an embodiment, an extension header of a geonetworking packet transmitted in a unicasting mode may include a sequence number (SN) field, a source position vector (SO PV) field, a destination position vector (DE PV) field and/or a reserved field.

The SN field represents an index of the geonetworking packet. In an embodiment, the SN field may be used for detecting a duplicate geonetworking packet. The SO PV field represents a long position vector including a reference position of a source. The DE PV field represents a shot position vector including a position of a destination.

Next, the V2X device may perform LLC layer processing, MAC layer processing, and physical layer processing of a V2X message. Further, the V2X communication device of the receiver side may perform reverse processes of the above-described process to obtain a V2X message. This is described with reference to FIG. 10 and therefore a detailed description thereof is omitted.

In the above embodiment, in an embodiment in which a V2X message of a CAM message or DENM message format is generated and is processed based on a BTP protocol and a geonetworking protocol, i.e., is processed in a BTP/geonetworking data path, a processing process of a V2X message has been described, but the scope of the present disclosure is not limited to the above-described embodiment. For example, a V2X message of an IP data format may be generated, and in this case, the V2X message may be processed according to an IP data path.

Further, in the above embodiment, an embodiment has been described in which the V2X communication device processes a single message for transmission and reception of a message unit, but the same or similar description may be applied to an embodiment of processing a message set for transmission and reception of a message set unit. The above-described processing process of the V2X message may be performed by at least one processor included in the V2X communication device.

Hereinafter, a method of controlling, by a V2X communication device, a vehicle using air pollution information provided from an air pollution information management system according to an embodiment of the present disclosure will be described.

First, an intelligent transport system (ITS) and air pollution information management system will be described. In addition, a method of communicatively connecting the ITS system and the air pollution information management system to each other will be described. Further, a V2X message used by a V2X communication device of the ITS system to control a vehicle on the basis of air pollution information will be described.

Figure 12:
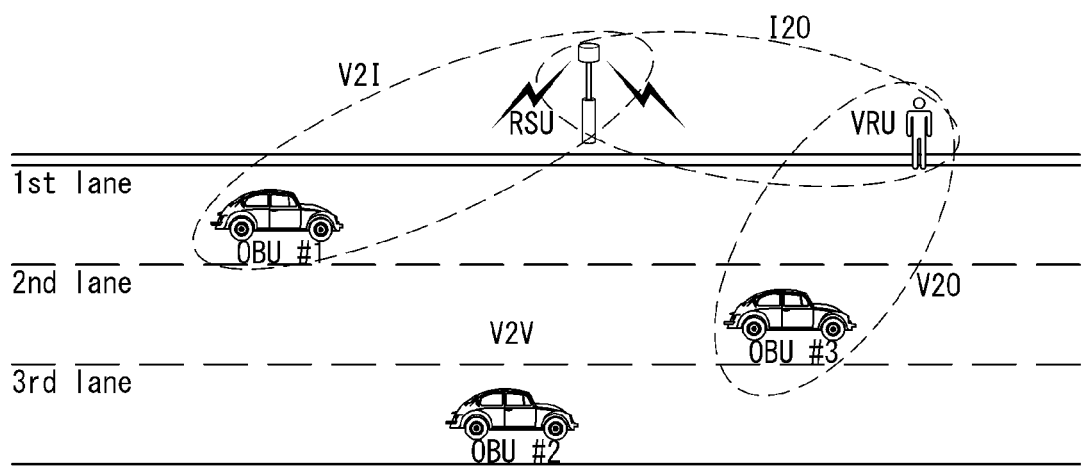
FIG. 12 shows an intelligent transport system (ITS) according to an embodiment of the present disclosure.

FIG. 12 illustrates an ITS system according to an embodiment of the present disclosure.

As described above, the ITS refers to a next-generation transportation system providing an efficient and safe transportation service by integrating an ITS technology such as electronic control and communication device to means of transportation such as cars, buses and trains and transportation facilities installed around roads such as traffic lights and electric signs. It means the next generation transportation system to provide.

The ITS system may include at least one V2X communication device (or station). As shown in FIG. 12, the ITS system may include at least one of a V2X communication device associated with an infrastructure, a V2X communication device associated with a vehicle, or a V2X communication device associated with a VRU. In this case, the V2X communication device associated with an infrastructure may be included in an RSU of the infrastructure (e.g., traffic lights), the V2X communication device associated with the vehicle may be included in an OBU of the vehicle, and the V2X communication device associated with the VRU may be included in an electronic device of the VRU.

The ITS system may perform V2X communication using a V2X communication device. V2X communication, a communication technology for supporting the ITS, is a technology for communication between stations having a V2X communication device. For example, V2V communication may be a communication technology between vehicles each having a V2X communication device, V2I communication may be a communication technology between a vehicle having a V2X communication device and an infrastructure, V2O may be a communication technology between a vehicle having the V2X communication device and a different entity (e.g., transportation vulnerable (VRU)), and I2O may be a communication technology between an infrastructure having a V2X communication device and a transportation vulnerable.

Figure 13:
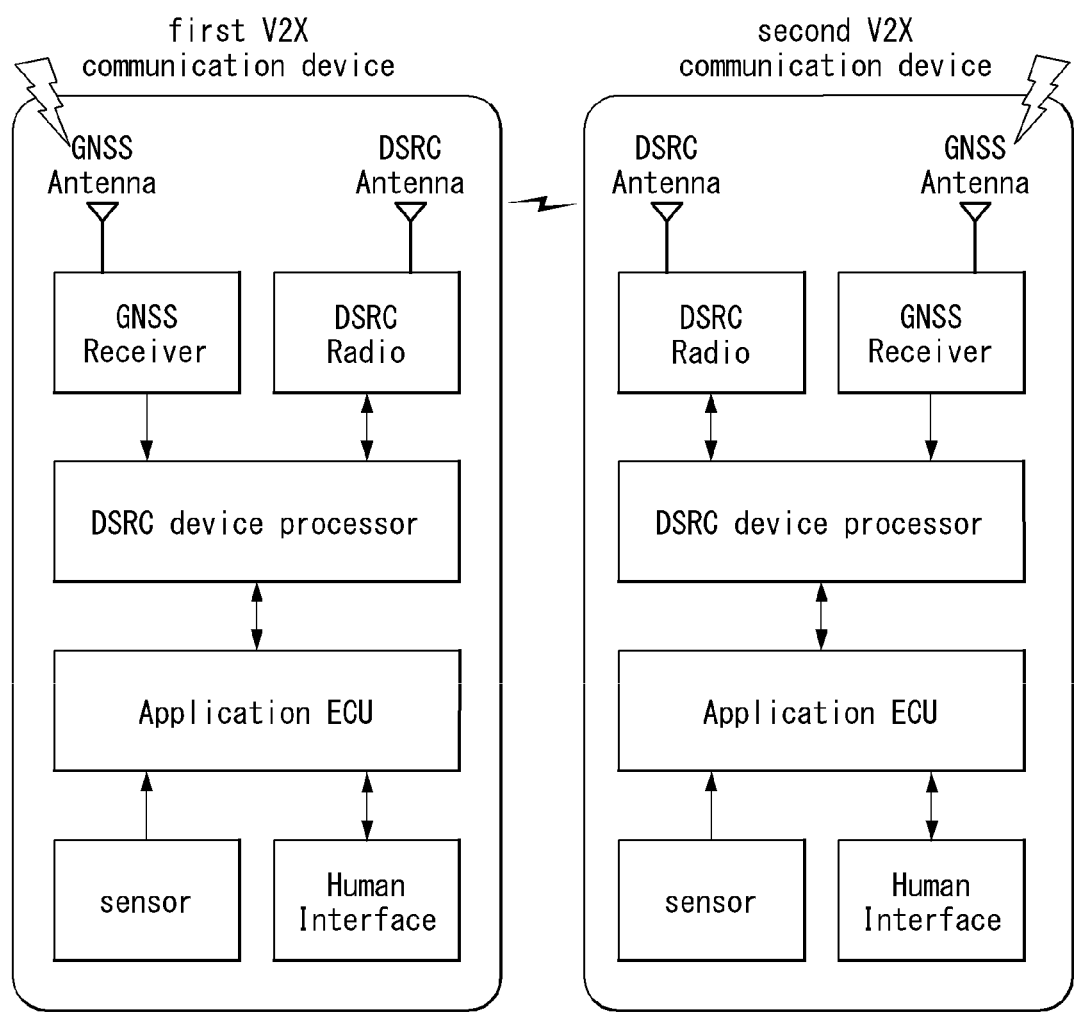
FIG. 13 illustrates a V2X system according to an embodiment of the present disclosure.

FIG. 13 illustrates a V2X system according to an embodiment of the present disclosure. In the V2X system of the embodiment of FIG. 13, each V2X communication device may perform V2X communication with another V2X communication device using a DSRC technology.

Referring to FIG. 13, a V2X system includes a first V2X communication device operating as a V2X transmitter and a second V2X communication device operating as a V2X receiver. In an embodiment, the first V2X communication device and the second V2X communication device may include at least one of a DSRC block, a global navigation satellite system (GNSS) block, a DSRC device processor block, an application ECU block, a sensor block, or a human interface block.

The DSRC block is a block for transmission of radio data and may include a DSRC antenna and a DSRC radio. In an embodiment, the DSRC block may be based on a wireless local area network (WLAN)-based IEEE802.1p standard and a wireless access in vehicle environment (WAVE) standard developed by SAE and may perform the operation of the MAC layer and the PHY layer of the protocol stack described above. In the present disclosure, the DSRC block may be referred to as a communication block/unit.

The DSRC device processor block may perform an operation of encoding or decoding a V2X message into a preset message format (e.g., WSM message format). In an embodiment, the DSRC device processor block may be connected to the DSRC block to implement all or some of the functions of the network/transport layer and access layer described above.

The GNSS block may be a block for obtaining position information and time information and include a GNSS antenna and a GSNN receiver. In an embodiment, the GNSS block may be a GPS device.

The application ECU block may be a microprocessor for providing a specific application service. In order to provide a specific application service, the application ECU block may perform an operation on the basis of sensing information and user input information and transmit and receive a necessary message through the DSRC device processor. In an embodiment, the application ECU may perform the functions of the application layer and facility layer described above.

The human interface block may input a state of a user through an input device (e.g., an input button) or output a warning message through a display device (e.g., a monitor). The sensor block may collect surrounding environment data through various sensing means.

According to an embodiment, the DSRC device processor block and the application ECU block may be included in one processor block. The processor block may include one or more processors. In this case, the processor of the processor block may implement each layer according to the ITS device or WAVE device described above. For example, the processor of the processor block may include some or all of the functions of the application layer, facility layer, network/transport layer, and/or access layer described above.

In the embodiment of FIG. 13, a configuration of the V2X communication device that communicates using a DSRC technology is described but the DSRC technology is only one of several communication technologies for V2X communication. For example, a communication technology such as 5G, LTE, or the like may be used for V2X communication. In this case, the DSRC block and the DSRC device processor block of the V2X communication device described above may be replaced with a communication module/unit and a processor suitable for the corresponding communication technology.

Figure 14:
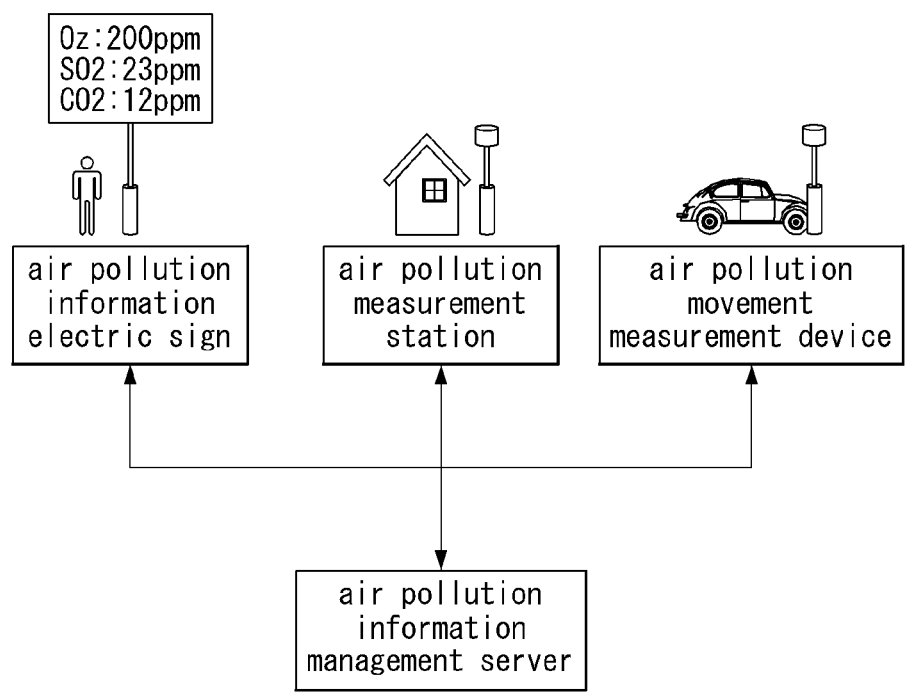
FIG. 14 illustrates an air pollution information management system according to an embodiment of the present disclosure.

FIG. 14 illustrates an air pollution information management system according to an embodiment of the present disclosure.

The air pollution information management system may collect/manage air pollution data such as a sulfurous acid gas, carbon monoxide, nitrogen dioxide, carbon dioxide, ozone, and micro dust measured at air pollution measurement stations nationwide. The air pollution data collected thusly may be used as air environment policy data in administrative agencies such as nations and local autonomous entities.

As illustrated in FIG. 14, the air pollution information management system may include at least one of an air pollution measurement station, an air pollution information electric sign, an air pollution movement measurement vehicle, or an air pollution information management server.

Air pollution measurement stations are installed on the basis of criteria such as partitioning by population density, distribution and transverse mercator (TM) coordinates and measure air pollutants (e.g., sulfur dioxide, carbon monoxide, carbon dioxide, ozone, fine dust, etc.). The air pollution information electric sign may be installed adjacent to the air pollution measurement station may be is installed near the side of roads or industrial complex with heavy foot-passenger traffic, allowing neighboring passers-by to obtain information on an air pollution level. In addition, the air pollution movement measurement vehicle may be used in an area where air pollution is expected, among the areas where there is no air pollution measurement station, or for the purpose of preliminary investigation when selecting a new air pollution measurement station. In addition, the collected data may be processed using the air pollution information management server.

Each terminal or station of the air pollution information management system may be connected to a TCP/IP network through each communication controller. However, the ITS system and the air pollution information management system described above are not connected or interworked with each other. Therefore, air pollution information provided in the air pollution information management system cannot be directly provided to a vehicle or the like through the ITS system.

Hereinafter, a method of providing air pollution information, which is provided by an air pollution information management system, in an ITS network will be described. Two methods may be used to provide air pollution information, which is provided in the air pollution information management system, in the ITS network.

One method is to install a V2X communication device in a terminal of the air pollution management system. If this method is used, air pollution information may be provided to vehicles or pedestrians moving near the air pollution measurement station through the V2X communication device, instead of providing air pollution information through the existing air pollution information electric sign.

Another method is to connect a TCP/IP network to a V2X communication device included in an existing vehicle or infrastructure. To this end, the V2X communication device must further include a communication module for communicating with the air pollution management system through the TCP/IP network. This will be described below with reference to FIG. 15.

Figure 15:
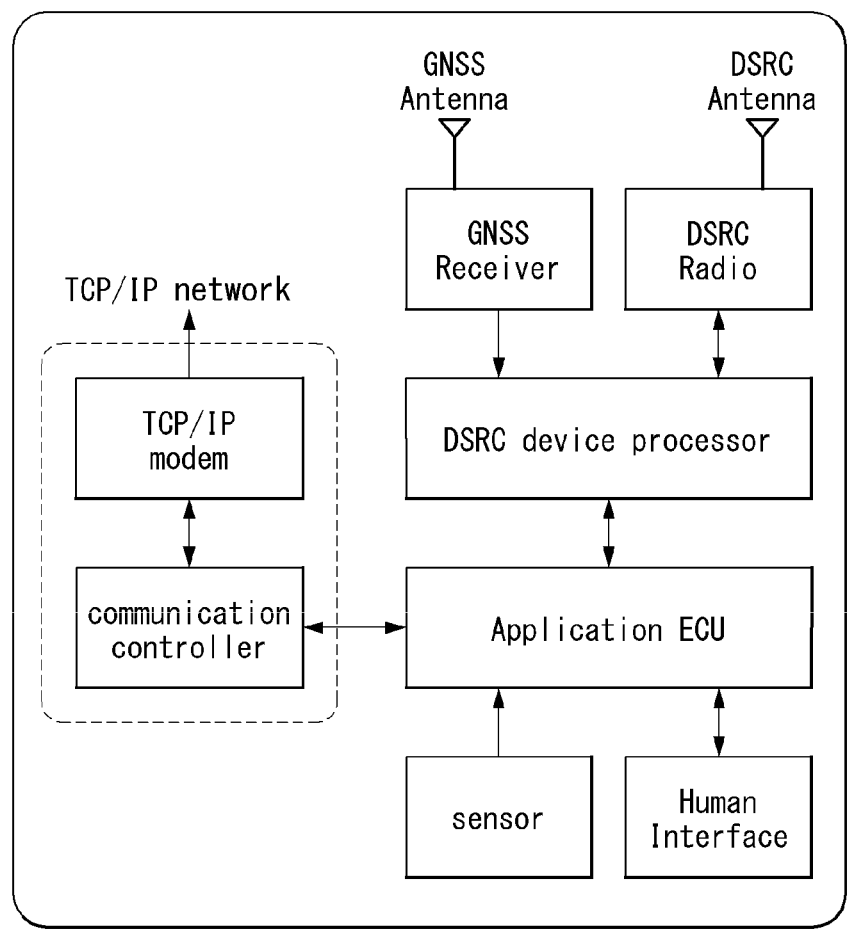
FIG. 15 shows a V2X communication device according to an embodiment of the present disclosure.

FIG. 15 illustrates a V2X communication device according to an embodiment of the present disclosure.

Referring to FIG. 15, the V2X communication device may include at least one of a DSRC block, a global navigation satellite system (GNSS) block, a DSRC device processor block, an application ECU block, a sensor block, a human interface block, or a TCP/IP communication block. The DSRC block, the GNSS block, the DSRC device processor block, the application ECU block, the sensor block, and the human interface block have been described with reference to FIG. 13, and thus, a detailed description thereof will be omitted.

The TCP/IP communication block, as a block for communicating with the air pollution information management system, may include a TCP/IP modem and a communication controller. The V2X communication device may access a network of the air pollution information management system through the TCP/IP modem block, and receive air pollution information from the air pollution information management system through a communication controller. The received air pollution information may be transferred to the application ECU block, and the application ECU block may generate an air pollution message that is a V2X message on the basis of the air pollution information. Such air pollution message will be described below.

FIG. 16 illustrates an air pollution message according to an embodiment of the present disclosure.

In the present disclosure, the air pollution message may be a V2X message that provides information related to air pollution (air pollution related information).

Referring to FIG. 16, the air pollution message may include at least one of ID information, position information, time information, alarm information, or air pollution numerical value information.

The ID information may include at least one of message ID (msgId) information or station ID (stationId) information.

The message ID information may indicate an ID of the air pollution message. The message ID information may be used to identify the air pollution message. In an embodiment, the message ID information may be defined using a format of "DSRCmsgID", which is a data element defined in the J2735 standard. In this case, the message ID information may indicate an ID of the corresponding air pollution message using the "DSRCmsgID" format of J2735.

The station ID information may indicate an ID of a station transmitting the air pollution message. The station ID information may be used to identify a station or V2X communication device which transmits the air pollution message. In an embodiment, the station ID information may be defined using a format of "TemporaryID" which is a data element defined in the J2735 standard. In this case, the station ID information may indicate an ID of the corresponding station using the "TemporaryID" format of J2735.

The position information may include at least one of station position (stationPosition) information or station type (stationType) information.

The station position information may indicate a position of a station which transmits the air pollution message. Such station position information may be used to provide two-dimensional or three-dimensional position information of the station or V2X communication device which transmits the air pollution message. In an embodiment, the station position information may be defined using a format of "Position3D", which is a data frame defined in the J2735 standard. In this case, the station position information may indicate a three-dimensional position (e.g., latitude, longitude, altitude) of the corresponding station using "Position3D" format of J2735.

The station type information may indicate a type of a station which transmits the air pollution message. In an embodiment, the type of the station may include at least one of a first type station that directly measures air pollution data or a second type station that uses the air pollution data measured by the first type station. In this case, the station type information may be used to indicate whether the corresponding station is a measurement station that directly measures air pollution. In an embodiment, the station type information may be optional information. That is, the station type information may be optionally included in the air pollution message.

If the station type information is set to a first value (e.g., 1), the station type information may indicate that the corresponding station is the first type station. If the station is the first type station, the station may generate an air pollution message using the air pollution data measured directly by the station.

If the station type information is set to the second value (e.g., 1), the station type information may indicate that the corresponding station is the second type station. If the station is the second type station, the station may generate an air pollution message using the air pollution data measured by the first type station.

The time information may include at least one of data generation time (dataGenerationTime) information, message generation time (msgGenerationTime) information, or update information.

The data generation time information may indicate a time at which the air pollution data was measured or generated. In an embodiment, the data generation time information may be defined using a format of "Dtime", which is a data frame defined in the J2735 standard. In this case, the data generation time information may represent a time at which the air pollution data is measured in units of hours, minutes, and seconds using the "Dtime" format of J2735.

The message generation time information may indicate a time at which the air pollution message was generated. In an embodiment, the message generation time information may be defined using the format of "Dtime", which is a data frame defined in the J2735 standard. In this case, the message generation time information may indicate a time at which the air pollution message was generated in units of hours, minutes, and seconds using the "Dtime" format of J2735.

The update information may indicate a time or period at which the air pollution data is updated. In an embodiment, the update information may be optional information. That is, the update information may be optionally included in the air pollution message. In an embodiment, the update information may be update (updatTime) information indicating a time at which air pollution data is updated or update period (updateRatio) information indicating a period at which air pollution data is updated.

If the update information is update time information, the update information may be defined using the format of "Dtime", which is a data frame defined in the J2735 standard. In this case, the update information may indicate a time at which the air pollution data is updated in units of hours, minutes, and seconds using the "Dtime" format of J2735.

If the update information is update period information, the update information may be defined using a newly defined format of "UpdataRatio". In an embodiment, "UpdataRatio" may be a data element indicating an update period of air pollution data in a preset unit (e.g., unit of 1 minute). In this case, the update information may indicate an update period of air pollution data in a preset unit using the "UpdataRatio" format.

The alarm information may provide an air pollution alarm. In an embodiment, the alarm information may provide an alarm for each level according to numerical values of air pollution. For example, in the case of ozone, the alarm information may provide an alarm from level 1 to level 4 according ozone values.

For example, when the ozone value is 0.030 ppm or less, the alarm information may provide an alarm of level 1 indicating that the ozone level is good. Alternatively, if the ozone level exceeds 0.030 ppm and 0.090 ppm or less, the alarm information may provide an alarm of level 2 indicating that the ozone level is normal. Alternatively, if the ozone value exceeds 0.090 ppm and 0.150 ppm or less, the alarm information may provide an alarm of level 3 indicating that the ozone value is bad. Alternatively, if the ozone value exceeds 0.150 ppm, the alarm information may provide an alarm of level 4 indicating that the ozone value is very bad.

The air pollution level information may include at least one of current air pollution numerical value (currentAPData) information or past air pollution numerical value (historyAPData) information. In the present disclosure, the current air pollution numerical value information may be abbreviated as current numerical value information and the past air pollution numerical value information may be abbreviated as past numerical value information.

The current numerical value information may indicate a current air pollution numerical value. In an embodiment, the current numerical value information may indicate a current air pollution numerical value for an air pollutant. For example, the current numerical value information may provide a current ozone numerical value or the like.

The past numerical value information may indicate a previous air pollution numerical value. In an embodiment, the past numerical value information may represent a previous air pollution numerical value for an air pollutant. In an embodiment, the past numerical value information may be optional information. That is, the past numerical value information may be optionally included in the air pollution message.

In an embodiment, the past numerical value information may include sequence elements and provide previous n air pollution numerical values according to the size of the sequence. For example, if the size of the sequence is 10, the past numerical value information may provide the previous 10 air pollution numerical values (e.g., ozone values). Through this, information on the progress of the air pollution numerical values may be provided.

The V2X communication device may transmit an air pollution message including past numerical value information to another V2X communication device. In this case, the V2X communication device that has received the air pollution message may easily recognize the progress of air pollution by checking the past air pollution numerical value using the past numerical value information.

FIG. 17 illustrates an air pollution message according to another embodiment of the present disclosure. In the embodiment of FIG. 17, the air pollution message may further include vehicle control information for controlling a vehicle on the basis of air pollution-related information, as well as the air pollution-related information.

Referring to FIG. 17, the air pollution message may include at least one of ID information, position information, time information, alarm information, air pollution numerical value information, or vehicle control information. The ID information, the position information, the time information, the alarm information, and the air pollution numerical value information have been described in detail with reference to FIG. 14, and thus, a redundant description thereof will be omitted.

The vehicle control information may include information associated with at least one type of vehicle control. In an embodiment, the type of vehicle control may include eco-driving control that controls the vehicle to operate in an eco-driving mode, auto-stop control that controls the vehicle to operate in an auto-stop mode, or recirculation control that controls the vehicle to operate in a recirculation mode. At least one of the rhythm control to control to operate in the) mode. In the present disclosure, the eco-driving control may be referred to as eco-driving mode control, the auto-stop control may be referred to as auto-stop mode control, and the recirculation control may be referred to as recirculation mode control. Also, in the present disclosure, the vehicle control information may also be referred to as control type information.

Here, the eco-driving mode is one of driving modes of the vehicle, and may be a mode for appropriately controlling an engine, transmission, and the like of the vehicle according to a preset control algorithm, while driving in order to improve fuel efficiency of the vehicle. In addition, the auto-stop mode is one of the vehicle stop modes, and may be a mode in which the engine of the vehicle is automatically stopped when the vehicle is stopped for a predetermined period or more. In addition, the recirculation mode is one of the air circulation modes of the vehicle, and may be a mode in which an air conditioning system of the vehicle uses internal air.

In an embodiment, the vehicle control information may be defined using a format of air pollution control (APControl) information, which is a newly defined data frame. The air pollution control information may be marked or encoded by the ASN.1 scheme and may provide control information for at least one of eco-driving control, auto-stop control, or recirculation control as a sequence element. This will be described below with reference to FIG. 18.

FIG. 18 shows air pollution control information according to an embodiment of the present disclosure.

Referring to FIG. 18, air pollution control information may include at least one of eco-driving control information for providing information related to eco-driving control, auto-stop control information for providing information related to auto-stop control, or recirculation control information for providing information related to recirculation control. In the present disclosure, the eco-driving control information, the auto-stop control information, and the recirculation control information may be referred to as first control information, second control information, and third control information, respectively.

In an embodiment, the first control information may include at least one of eco-driving mode information indicating a mode of eco-driving control or eco-driving lifetime information indicating a lifetime of the eco-driving control. The second control information may include at least one of auto-stop mode information indicating a mode of auto-stop control or auto-stop lifetime information indicating a lifetime of the auto-stop control. In addition, the third control information may include at least one of recirculation mode information indicating a mode of recirculation control or recirculation lifetime information indicating a lifetime of the recirculation control.

In an embodiment, the eco-driving mode information, the auto-stop mode information, and/or the recirculation mode information may be defined using a format of air pollution control mode (APControlMode) information, which is a predefined data frame. The air pollution control mode information may be marked or encoded by the ASN.1 scheme and may provide mode information on at least one of a release mode, a recommended mode (OnRecommend), and a mandatory mode (OnMandatory) as an enumerated element. This will be described below with reference to FIG. 19.

In an embodiment, the eco-driving lifetime information, the auto-stop lifetime information, and/or the recreation lifetime information may be defined using the format of "DTime", which is a data element defined in the J2735 standard. In this case, the eco-driving lifetime information, the auto-stop lifetime information, and the recirculation lifetime information may indicate the lifetime of the eco-driving control, the auto-stop control, and the recirculation control in units of hours, minutes, and seconds using the "DTime" format of J2735, respectively.

FIG. 19 illustrates air pollution control mode information according to an embodiment of the present disclosure.

As described above, the air pollution control mode information may indicate a mode of vehicle control. For example, in the case of eco-driving control, the air pollution control mode information may indicate a mode of the eco-driving control. In the present disclosure, the air pollution control mode information may be abbreviated as control mode information.

In an embodiment, if the air pollution control mode information is set to a first value (e.g., 0), the air pollution control mode information may indicate release of the corresponding vehicle control (release mode). Alternatively, if the air pollution control mode information is set to a second value (e.g., 1), the air pollution control mode information may recommend an operation of the vehicle control (recommended mode). Alternatively, if the air pollution control mode information is set to a third value (e.g., 2), the air pollution control mode information may indicate an operation of the vehicle control (mandatory mode).

In the mandatory mode, the air pollution control mode information is used to mandatorily turn on the vehicle control. Meanwhile, in the recommended mode, the air pollution control mode information may be used to recommend "ON" of the corresponding vehicle control. Therefore, if the air pollution message including the air pollution control mode information set to the recommended mode is received, the V2X communication device may provide a driver with a guidance image or voice for recommending "ON" of the vehicle control. However, if the vehicle is in the auto mode, the V2X communication device may "turn on" the corresponding vehicle control even in the recommended mode without a guidance voice. That is, when the vehicle is in the auto mode, the V2X communication device may perform an operation of mandatorily turning on the corresponding vehicle control in the recommended mode and the mandatory mode equally.

Figure 20:
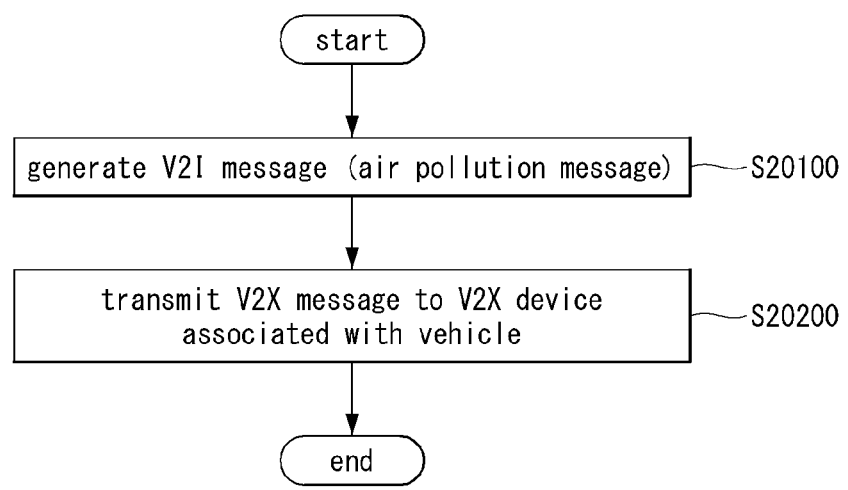
FIG. 20 is a flowchart illustrating a method of transmitting an air pollution message by a V2X communication device according to an embodiment of the present disclosure.

FIG. 20 is a flowchart illustrating a method of transmitting an air pollution message by a V2X communication device according to an embodiment of the present disclosure. In the embodiment of FIG. 20, the V2X communication device which transmits an air pollution message may be a first V2X communication device associated with an infrastructure or a vehicle. In this case, the first V2X communication device may be included in an RSU of the infrastructure or an OBU of the vehicle.

The first V2X communication device may generate an air pollution message including information related to air pollution (S20100). In an embodiment, the air pollution message may include all or part of the information included in the air pollution message of the embodiment of FIG. 16 or 17. For example, the air pollution message may include at least one of ID information, position information, time information, alarm information, air pollution numerical value information, or vehicle control information.

In an embodiment, the first V2X communication device may receive air pollution information from the air pollution information management system, and generate an air pollution message on the basis of the air pollution information. The air pollution information may include, for example, numerical data on at least one air pollutant.

The first V2X communication device may transmit the air pollution message to a second V2X communication device associated with the vehicle (S20200). In an embodiment, the first V2X communication device may transmit the air pollution message to the second V2X communication device through a DSRC network.

In order to transmit the air pollution message, the first V2X communication device may perform network/transport layer processing and access layer processing. For example, the first V2X communication device may generate a WSMP packet by performing network/transport layer processing on the air pollution message, and transmit a communication signal including the air pollution message through the DSRC network by performing access layer processing on the WSMP packet. This has been described above with reference to FIGS. 1 and 10.

In the embodiment of FIG. 20, the first V2X communication device may correspond to a transmission device that generates a V2X message such as an air pollution message and transmits the V2X message to a nearby V2X communication device. However, the first V2X communication device is not limited to the transmission device. The first V2X communication device may correspond to a reception device that receives the V2X message such as an air pollution message and provides a V2X service on the basis of the V2X message.

Figure 21:
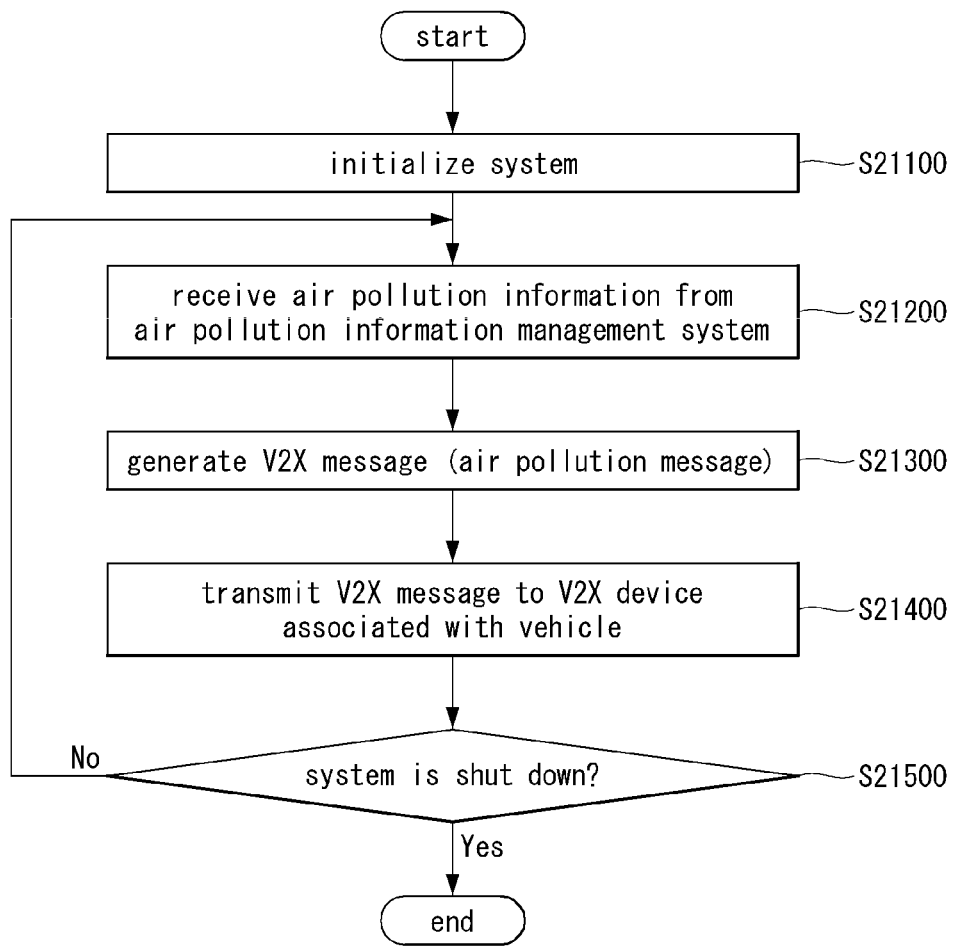
FIG. 21 is a flowchart illustrating a method of transmitting an air pollution message by a V2X communication device according to an embodiment of the present disclosure.

FIG. 21 is a flowchart illustrating a method of transmitting an air pollution message by a V2X communication device according to an embodiment of the present disclosure. In the embodiment of FIG. 21, the V2X communication device transmitting the air pollution message may be a first V2X communication device associated with an infrastructure or a vehicle. In this case, the first V2X communication device may be included in the RSU of the infrastructure or the OBU of the vehicle. In FIG. 21, a description of the same content as that described above with reference to FIG. 20 will be omitted.

The first V2X communication device may perform a system initialization process (S21100). When the device is first started, the first V2X communication device may perform initialization for each block/unit.

The first V2X communication device may receive air pollution information from the air pollution information management system (S21200). In an embodiment, the first V2X communication device may receive air pollution information from the air pollution information management system using a TCP/IP communication module.

The first V2X communication device may generate an air pollution message on the basis of the air pollution information (S21300). In an embodiment, the air pollution message may include all or part of the information included in the air pollution message of the embodiment of FIG. 16 or 17. For example, the air pollution message may include at least one of ID information, position information, time information, alarm information, air pollution numerical value information, or vehicle control information.

The first V2X communication device may transmit an air pollution message to the second V2X communication device associated with the vehicle (S21400). In an embodiment, the first V2X communication device may transmit an air pollution message to the second V2X communication device through the DSRC network. As described above, in order to transmit the air pollution message, the first V2X communication device may perform network/transport layer processing and access layer processing.

The first V2X communication device may determine whether to shut down the system/device (S21500). In an embodiment, the first V2X communication device may determine whether to shut down the system on the basis of a system shutdown command. For example, when the system shutdown command is received, the first V2X communication device may shut down the system. In another example, if no system shutdown command is received, the first V2X communication device may continue to operate. In this case, the first V2X communication device may receive air pollution information again from the air pollution information management system, and generate and transmit an air pollution message on the basis of the received air pollution information. In an embodiment, the first V2X communication device may receive the air pollution information again from the air pollution information management system after a transmission period of a next air pollution message has elapsed.

In the embodiment of FIG. 21, the first V2X communication device may correspond to a transmission device for generating a V2X message such as an air pollution message and transmitting the V2X message to a nearby V2X communication device. However, the first V2X communication device is not limited to the transmission device. The first V2X communication device may correspond to a reception device that receives a V2X message such as an air pollution message and provides a V2X service on the basis of the V2X message.

Figure 22:
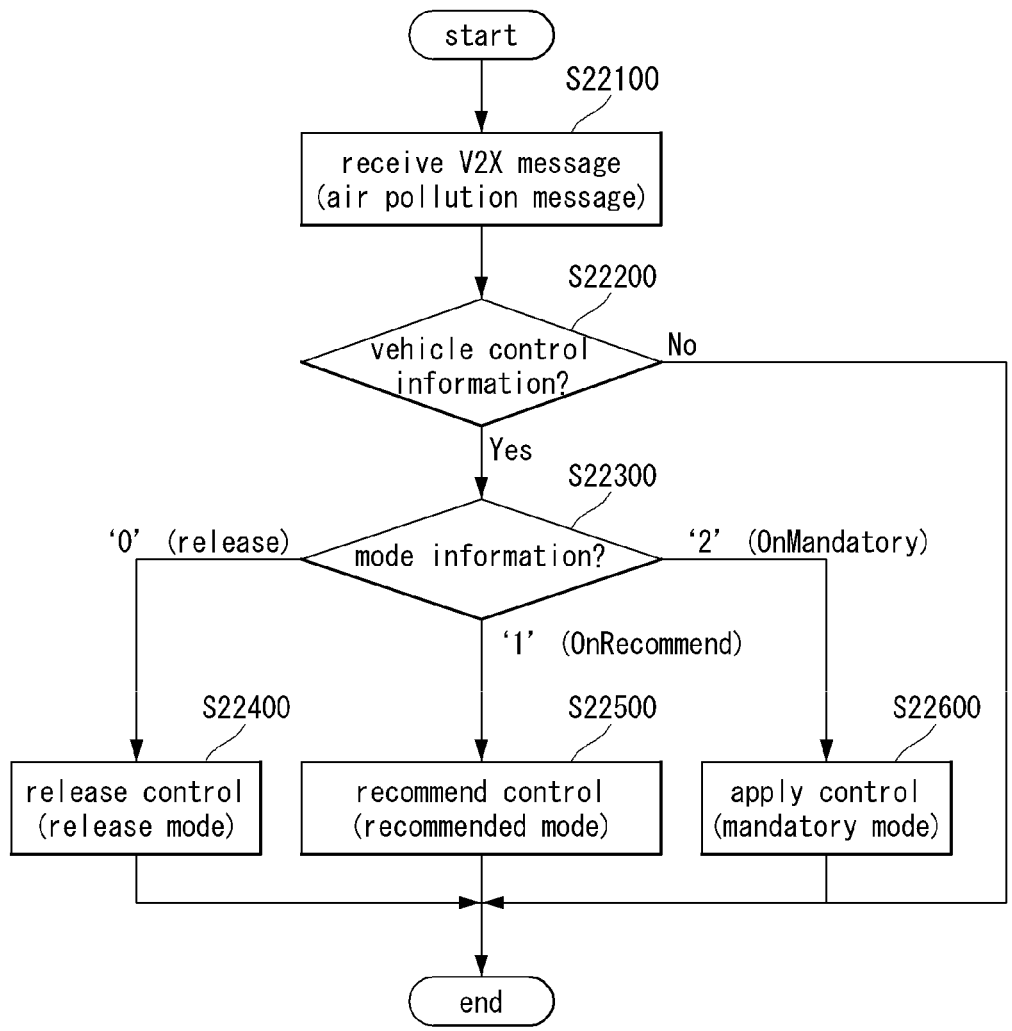
FIG. 22 is a flowchart illustrating a method of receiving an air pollution message by a V2X communication device according to an embodiment of the present disclosure.

FIG. 22 is a flowchart illustrating a method of receiving an air pollution message by a V2X communication device according to an embodiment of the present disclosure. In the embodiment of FIG. 22, the V2X communication device which receives the air pollution message may be a second V2X communication device associated with the vehicle. In this case, the second V2X communication device may be included in the OBU of the vehicle.

The second V2X communication device may receive an air pollution message from the first V2X communication device (S22100). In an embodiment, the air pollution message may include all or part of the information included in the air pollution message of the embodiment of FIG. 16 or 17. For example, the air pollution message may include at least one of ID information, position information, time information, alarm information, air pollution numerical value information, or vehicle control information.

In an embodiment, the second V2X communication device may receive a communication signal including an air pollution message and receive/acquire the air pollution message by performing access layer processing and network/transport layer processing on the communication signal. The process of acquiring the air pollution message by performing access layer processing and network/transport layer processing on the communication signal in the second V2X communication device may be performed as a reverse process of the process of generating the communication signal by performing access layer processing and network/transport layer processing on the air pollution message in the first V2X communication device as described above.

The second V2X communication device may determine whether the air pollution message includes vehicle control information (S22200). If the air pollution message does not include vehicle control information, the second V2X communication device may move to a system shutdown step.

If the air pollution message includes vehicle control information, the second V2X communication device may acquire mode information on each vehicle control included in the vehicle control information and determine a value of the mode information (S22300). In an embodiment, the vehicle control information may include information on at least one type of vehicle control. In this case, the type of vehicle control may include at least one of eco-driving control, auto-stop control, or recirculation control. In addition, the second V2X communication device may perform vehicle control on the basis of the value of the mode information.

For example, if the mode information is a first value (e.g., 0) (release mode), the second V2X communication device may release the vehicle control (S22400).

Alternatively, if the mode information is a second value (e.g., 1) (recommended mode), the second V2X communication device may provide the user with guidance recommending "ON" of vehicle control (S22500). In this case, the second V2X communication device may provide the user with a guidance voice or the like for recommending "ON" of the vehicle control through a human interface.

Alternatively, if the mode information is a third value (e.g., 2) (mandatory mode), the second V2X communication device may mandatorily "turn on" the vehicle control (S22600). In this case, the second V2X communication device may obtain lifetime information on the corresponding vehicle control included in the vehicle control information and set a timer on the basis of the lifetime information. Through this, a lifetime during which each vehicle control is operated may be set.

Hereinafter, a method of performing vehicle control on the basis of a value of mode information using the eco-driving control as an example will be described in detail. For example, if the mode information is the first value (e.g., 0), the second V2X communication device may release the eco-driving control. Alternatively, if the mode information is the second value (e.g., 1), the second V2X communication device may provide the user with guidance for recommending "ON" of the eco-driving control. Alternatively, if the mode information is the third value (e.g., 2), the second V2X communication device may mandatorily "turn on" the eco-driving control. In this case, the second V2X communication device may acquire lifetime information on the eco-driving control included in the vehicle control information, and set the timer on the basis of the lifetime information. Through this, it is possible to set a lifetime during which the eco-driving control is operated. The same or similar procedure may also be performed in the auto-stop control and recirculation control. An exemplary operating scenario of each vehicle control will be described below with reference to FIGS. 24 to 25.

Figure 23:
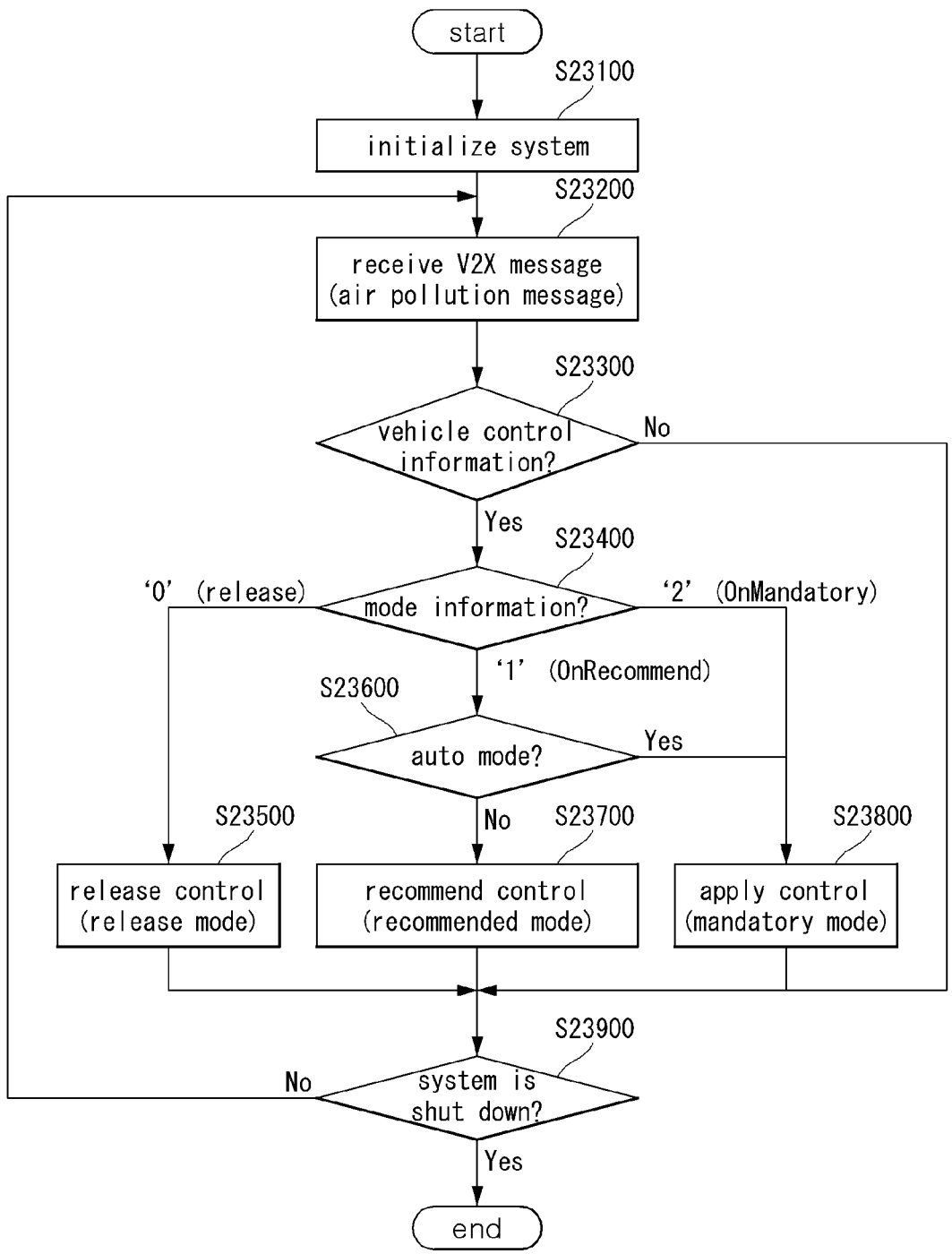
FIG. 23 is a flowchart illustrating a method of receiving an air pollution message by a V2X communication device according to another embodiment of the present disclosure.

FIG. 23 is a flowchart illustrating a method of receiving an air pollution message by a V2X communication device according to another embodiment of the present disclosure. In the embodiment of FIG. 23, the V2X communication device receiving the air pollution message may be the second V2X communication device associated with the vehicle. In this case, the second V2X communication device may be included in the OBU of the vehicle. In FIG. 23, a description of the same content as that described above with reference to FIG. 22 will be omitted.

The second V2X communication device may perform a system initialization process (S23100). When the device is first started, the second V2X communication device may perform initialization on each block/unit.

The second V2X communication device may receive an air pollution message from the first V2X communication device (S23200). In an embodiment, the air pollution message may include all or part of the information included in the air pollution message of the embodiment of FIG. 16 or 17. In an embodiment, the second V2X communication device may receive a communication signal including the air pollution message and receive/acquire the air pollution message by performing access layer processing and network/transport layer processing on the communication signal.

The second V2X communication device may determine whether the air pollution message includes vehicle control information (S23300). If the air pollution message does not include the vehicle control information, the second V2X communication device may move to a system shutdown step.

If the air pollution message includes vehicle control information, the second V2X communication device may obtain mode information on each vehicle control included in the vehicle control information, and the second V2X communication device may determine a value of the mode information (S23400). In an embodiment, the vehicle control information may include information on at least one type of vehicle control. In this case, the type of vehicle control may include at least one of eco-driving control, auto-stop control, or recirculation control. In addition, the second V2X communication device may perform vehicle control on the basis of the value of the mode information.

For example, if the mode information is the first value (e.g., 0) (release mode), the second V2X communication device may release the vehicle control (S23500).

Alternatively, if the mode information is the second value (e.g., 1) (recommended mode), the second V2X communication device may determine whether the vehicle is in the auto mode (S23600). If the vehicle is not in the auto mode, the second V2X communication device may provide the user with a guidance recommending "ON" of vehicle control (S23700). In this case, the second V2X communication device may provide the user with a guidance voice or the like for recommending "ON" of the vehicle control through a human interface.

If the vehicle is not in the auto mode or if the mode information is the third value (e.g., 2) (mandatory mode), the second V2X communication device may mandatorily "turn on" the vehicle control (S23800). In this case, the second V2X communication device may obtain lifetime information on the corresponding vehicle control included in the vehicle control information, and set a timer on the basis of the lifetime information. Through this, a lifetime during which each vehicle control is operated may be set.

Hereinafter, a method of performing vehicle control on the basis of a value of mode information using the eco-driving control as an example will be described in detail. For example, if the mode information is the first value (e.g., 0), the second V2X communication device may release the eco-driving control. Alternatively, if the mode information is the second value (e.g., 1) and the vehicle is not in the auto mode, the second V2X communication device may provide the user with guidance for recommending "ON" of the eco-driving control. Alternatively, if the mode information is the second value (e.g., 1) and the vehicle is in the auto mode or alternatively if the mode information is the third value (e.g., 2), the second V2X communication device may mandatorily "turn on" the eco-driving control. In this case, the second V2X communication device may acquire lifetime information on the eco-driving control included in the vehicle control information, and set the timer on the basis of the lifetime information. Through this, it is possible to set a lifetime during which the eco-driving control is operated. The same or similar procedure may also be performed in the auto-stop control and recirculation control. An exemplary operating scenario of each vehicle control will be described below with reference to FIGS. 24 and 25.

The second V2X communication device may determine whether to shut down the system/device (S23900). In an embodiment, the first V2X communication device may determine whether to shut down the system on the basis of a system shutdown command. For example, when the system shutdown command is received, the first V2X communication device may shut down the system. In another example, if no system shutdown command is received, the first V2X communication device may continue to operate. In this case, the first V2X communication device may receive the air pollution message again, and then perform the operation again.

Figure 24:
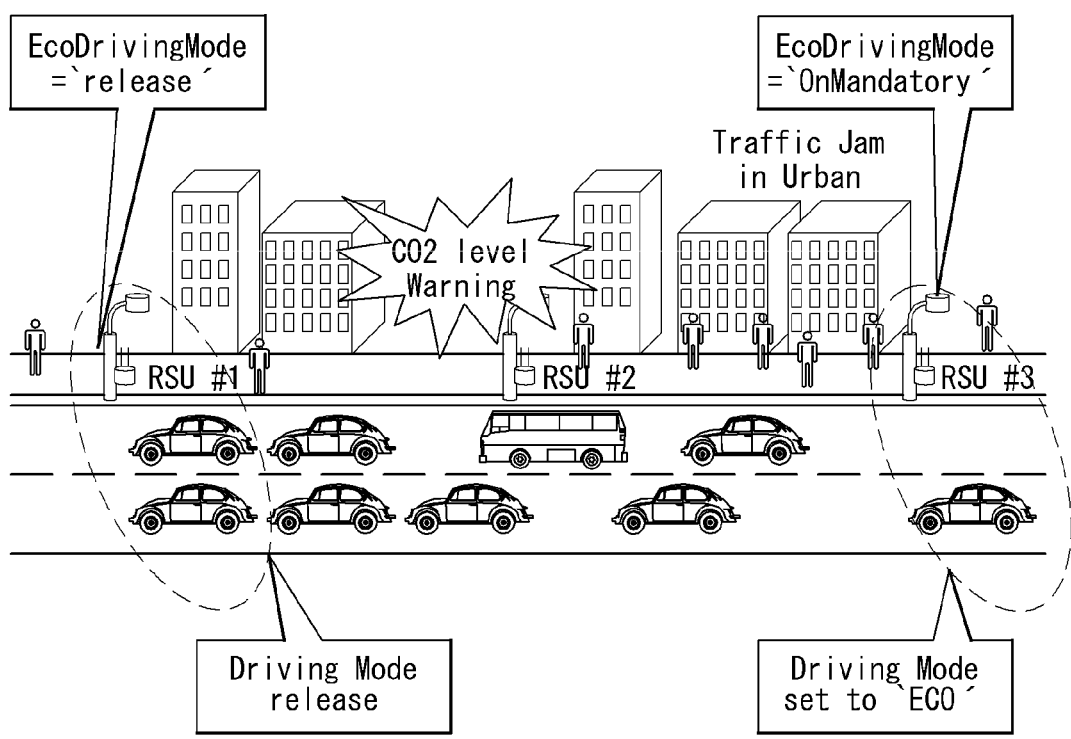
FIG. 24 shows an exemplary operating scenario of eco-driving mode control according to an embodiment of the present disclosure.

FIG. 24 shows an exemplary operating scenario of eco-driving mode control according to an embodiment of the present disclosure. The embodiment of FIG. 24 describes an operation scenario in which a downtown area environment with heavy traffic is assumed and a driving mode of the vehicle is switched to an eco-driving mode according to a change in a carbon dioxide numerical value in this environment.

Referring to FIG. 24, a V2X communication device (e.g., a V2X communication device included in RSU #3) located in an area where a downtown area starts sets eco-driving mode information of vehicle control information to a mandatory mode and transmit an air pollution message including the information to a nearby V2X communication device. In this case, the V2X communication device (e.g., the V2X communication device associated with the vehicle) that receives the corresponding air pollution message switch a driving mode of the vehicle to the eco-driving mode on the basis of the eco-driving mode information. Through this, the amount of air pollutants such as carbon dioxide emitted from vehicle which enters the downtown area may be reduced.

The V2X communication device (e.g., the V2X communication device included in RSU #2) located in a central area of the downtown area having a high air pollution numerical value may transmit an air pollution message including alarm information to the nearby V2X communication device. Through this, a driver of the vehicle located in the central area of the downtown area may check an alarm level of air pollutants such as carbon dioxide.

A V2X communication device (e.g., a V2X communication device included in RUS #1) located in an area where the downtown area ends or where the air pollution numerical value is low may set the eco-driving mode information of the vehicle control information to a release mode and transmit an air pollution message including the information to the nearby V2X communication device. In this case, a V2X communication device (e.g., the V2X communication device associated with the vehicle) that receives the corresponding air pollution message may switch the driving mode of the vehicle from the eco-driving mode to the set mode (e.g., the basic driving mode) on the basis of the eco-driving mode information. Through this, the vehicle located outside the downtown area or in an area having a low air pollution numerical value may freely drive according to the default mode.

In the embodiments of FIG. 24, the V2X communication device transmits an air pollution message including different eco-driving mode information according to a position of the V2X communication device or a station including the V2X communication device. In this case, each V2X communication device transmitting different eco-driving mode information is identified by station ID information and station position information and may be distinguished from other V2X communication devices.

Figure 25:
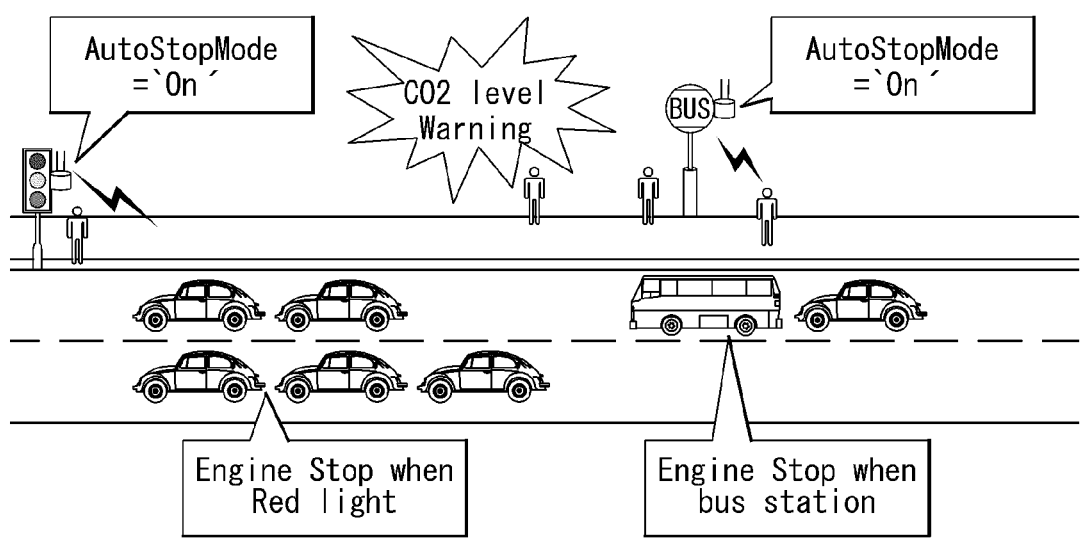
FIG. 25 shows an exemplary operating scenario of auto-stop mode control according to an embodiment of the present disclosure.

FIG. 25 illustrates an exemplary operating scenario of auto-stop mode control according to an embodiment of the present disclosure. The embodiment of FIG. 25 describes an operation scenario in which a downtown area environment having a high carbon dioxide numerical value due to high traffic congestion and a stop mode of a vehicle is switched to an auto-stop mode at a position where many VRUs exist in the environment.

Referring to FIG. 25, a V2X communication device located at a traffic light (e.g., a V2X communication device included in an RSU installed at the traffic light) may set auto-stop mode information of vehicle control information to a mandatory mode and transmit an air pollution message including the information to a nearby V2X communication device. In this case, the V2X communication device (e.g., the V2X communication device associated with the vehicle) that receives the corresponding air pollution message may switch the stop mode of the vehicle to the auto-stop mode on the basis of the auto-stop mode information. Thereafter, when the vehicle is stopped through a stop signal of a traffic light, the engine of the vehicle may be stopped. Through this, the amount of air pollutants such as carbon dioxide emitted from the vehicle stopped by the stop signal of the traffic light may be reduced. This allows pedestrians near the traffic light to be less exposed to air pollutants.

A V2X communication device located at a bus stop (e.g., a V2X communication device included in an RSU installed at the bus stop) may set auto-stop mode information of vehicle control information to a mandatory mode and transmit an air pollution message including the information to a nearby V2X communication device. In this case, the V2X communication device (e.g., the V2X communication device associated with the vehicle) that receives the corresponding air pollution message may switch the stop mode of the vehicle to the auto-stop mode on the basis of the auto-stop mode information. Thereafter, when the corresponding vehicle is stopped at the bus stop, the engine of the vehicle may be stopped. Through this, the amount of air pollutants such as carbon dioxide emitted from the vehicle stopped at the bus stop may be reduced. This allows passengers near the bus stop to be less exposed to air pollutants.

In the embodiments of FIG. 25, the V2X communication device transmits an air pollution message including different auto-stop mode information according to a position of the V2X communication device or a station including the V2X communication device. In this case, each V2X communication device transmitting different auto-stop mode information is identified by station ID information and station position information and may be distinguished from other V2X communication devices.

Figure 26:
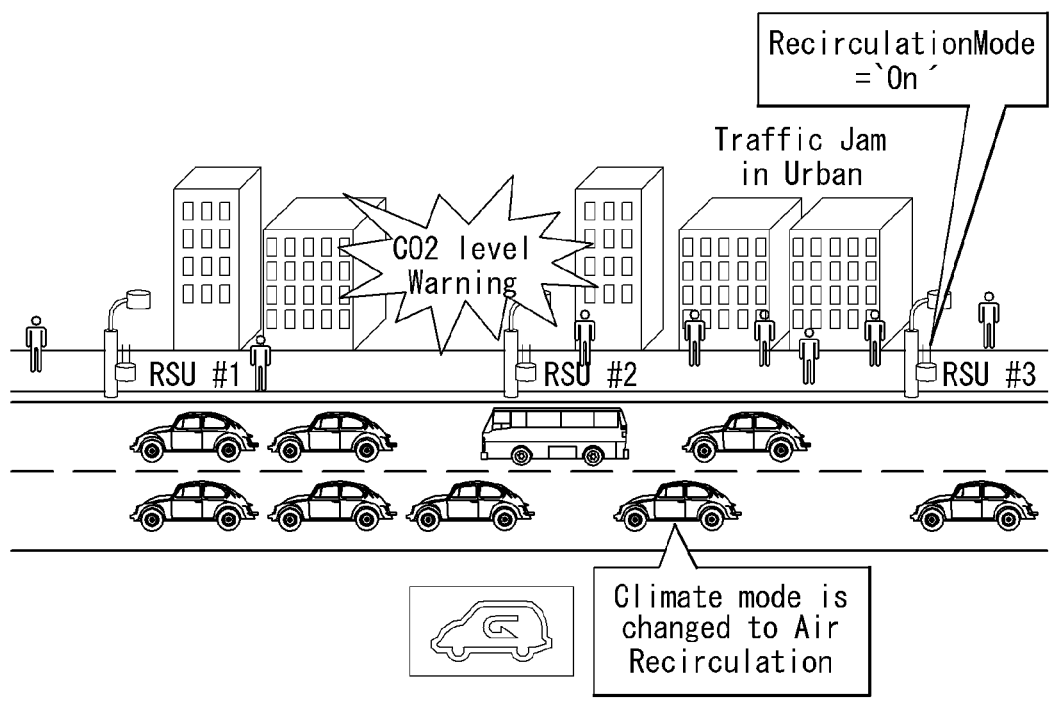
FIG. 26 shows an exemplary operating scenario of recirculation mode control according to an embodiment of the present disclosure.

FIG. 26 shows an exemplary operating scenario of recirculation mode control according to an embodiment of the present disclosure. The embodiment of FIG. 26 describes an operation scenario in which a downtown area environment having a high carbon dioxide numerical value due to a high traffic congestion is assumed and an air-conditioning system of the vehicle is switched to an internal circulation mode according to the carbon dioxide numerical value in the environment.

Referring to FIG. 26, if an air pollution numerical value is a predetermined value or greater, a V2X communication device located at a street light or a traffic light (e.g., a V2X communication device included in an RSU installed at the street light or the traffic light) may set recirculation mode information of vehicle control information to an internal circulation mode. The V2X communication device may transmit an air pollution message including the vehicle control information to a nearby V2X communication device.

In this case, the V2X communication device (e.g., the V2X communication device associated with the vehicle) that receives the corresponding air pollution message may switch the air-conditioning system of the vehicle to the internal circulation mode on the basis of the recirculation mode information. Through this, it is possible to protect a driver of the vehicle traveling in an area with a high air pollution numerical value.

In the embodiment of FIG. 26, the V2X communication device transmits an air pollution message including different recirculation mode information according to the position of the V2X communication device or a station including the V2X communication device. In this case, each V2X communication device that transmits the different recirculation mode information may be identified by station ID information and station position information and may be distinguished from other V2X communication devices.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of an embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

It is understood by those skilled in the art that various changes and modifications can be made in the present invention without departing from the spirit or scope of the invention. Therefore, it is intended that the present invention cover the modifications and variations of this invention provided they come within the scope of the appended claims and their equivalents.

Reference is made herein to both apparatus and method inventions and descriptions of both apparatus and method inventions may be complementary to one another.

Various embodiments have been described in the best mode for carrying out the invention.

INDUSTRIAL APPLICABILITY

The present invention is used in a series of V2X communication fields.

It is apparent to those skilled in the art that various changes and modifications can be made in the present invention without departing from the spirit or scope of the invention. Therefore, it is intended that the present invention cover the modifications and variations of this invention provided they come within the scope of the appended claims and their equivalents.

The invention claimed is:
1. A method of transmitting a V2X message by a first V2X communication device, the method comprising:
receiving air pollution information from a station;
generating a V2X message which includes (i) vehicle control information, which is based on the air pollution information, for setting a driving mode and/or a stop mode of a vehicle, and (ii) station type information indicating a type of the station from which the air pollution information is received; and transmitting the V2X message to a second V2X communication device associated with the vehicle, wherein based on the vehicle control information, the driving mode is set to an eco-driving mode and the stop mode is set to an auto-stop mode, wherein the eco-driving mode is a mode for controlling an engine and transmission of the vehicle according to a preset control algorithm to reduce an amount of air pollutants emitted from the vehicle, wherein the auto-stop mode is a mode in which the engine of the vehicle is automatically stopped based on the vehicle stopping for at least a predetermined period of time, wherein the predetermined period of time is a period for which the vehicle is stopped at a stop signal of a traffic light or at a bus stop, wherein the station type information relates to (i) a first type station directly measuring air pollution data or (ii) a second type station using the air pollution data measured by the first type station, and wherein the air pollution information received from the station is based on the air pollution data.

2. The method of claim 1,
wherein the vehicle control information includes control mode information indicating a mode for controlling the vehicle, and
wherein the control mode information includes at least one of eco-driving mode information indicating the eco-driving mode or auto-stop mode information indicating the auto-stop mode.

3. The method of claim 2, wherein
based on the control mode information being set to a first value, the control mode information instructs to perform a release mode for corresponding vehicle control,
based on the control mode information being set to a second value, the control mode information instructs to perform a recommended mode for corresponding vehicle control, and
based on the control mode information being set to a third value, the control mode information instructs to execute a mandatory mode for corresponding vehicle control.

4. The method of claim 2,
wherein the vehicle control information further includes at least one of eco-driving lifetime information indicating a lifetime of the eco-driving mode or auto-stop lifetime information indicating a lifetime of the auto-stop mode.

5. A first V2X communication device for transmitting a V2X message, the first V2X communication device comprising:
a communication unit configured to transmit and receive a communication signal; and
a processor configured to control the communication unit, wherein the processor is configured to:
receive air pollution information from a station,
generate a V2X message which includes (i) vehicle control information, which is based on the air pollution information, for setting a driving mode and/or a stop mode of a vehicle, and (ii) station type information indicating a type of the station from which the air pollution information is received; and
transmit the V2X message to a second V2X communication device associated with the vehicle, wherein based on the vehicle control information, the driving mode is set to an eco-driving mode and the stop mode is set to an auto-stop mode, wherein the eco-driving mode is a mode for controlling an engine and transmission of the vehicle according to a preset control algorithm to reduce an amount of air pollutants emitted from the vehicle, wherein the auto-stop mode is a mode in which the engine of the vehicle is automatically stopped based on the vehicle stopping for at least a predetermined period of time, wherein the predetermined period of time is a period for which the vehicle is stopped at a stop signal of a traffic light or at a bus stop, wherein the station type information relates to (i) a first type station directly measuring air pollution data or (ii) a second type station using the air pollution data measured by the first type station, and wherein the air pollution information received from the station is based on the air pollution data.

6. The first V2X communication device of claim 5,
wherein the vehicle control information includes control mode information indicating a mode for controlling the vehicle, and
wherein the control mode information includes at least one of eco-driving mode information indicating the eco-driving mode or auto-stop mode information indicating the auto-stop mode.

7. The first V2X communication device of claim 6, wherein
based on the control mode information being set to a first value, the control mode information instructs to perform a release mode for corresponding vehicle control,
based on the control mode information being set to a second value, the control mode information instructs to perform a recommended mode for corresponding vehicle control, and
based on the control mode information being set to a third value, the control mode information instructs to execute a mandatory mode for corresponding vehicle control mode information instructs to execute a mandatory mode for corresponding vehicle control.

8. The first V2X communication device of claim 6,
wherein the vehicle control information further includes at least one of eco-driving lifetime information indicating a lifetime of the eco-driving mode or auto-stop lifetime information indicating a lifetime of the auto-stop mode.

9. A method of receiving a V2X message from a first V2X communication device by a second V2X communication device associated with a vehicle, the method comprising:
receiving a V2X message from the first V2X communication device, wherein the V2X message includes station type information indicating a type of a station which transmits air pollution information to the first V2X communication device;
determining whether the V2X message also includes vehicle control information, which is based on the air pollution information, for setting a driving mode and/or a stop mode of the vehicle; and
based on a determination that the V2X message includes the vehicle control information, setting the driving mode and/or the stop mode based on the vehicle control information, wherein based on the vehicle control information, the driving mode is set to an eco-driving mode and the stop mode is set to an auto-stop mode, wherein the eco-driving mode is a mode for controlling an engine and transmission of the vehicle according to a preset control algorithm to reduce an amount of air pollutants emitted from the vehicle, wherein the auto-stop mode is a mode in which the engine of the vehicle is automatically stopped based on the vehicle stopping for at least a predetermined period of time, wherein the predetermined period of time is a period for which the vehicle is stopped at a stop signal of a traffic light or at a bus stop, wherein the station type information relates to (i) a first type station directly measuring air pollution data or (ii) a second type station using the air pollution data measured by the first type station, and wherein the air pollution information is based on the air pollution data.

10. The method of claim 9, wherein the vehicle control information includes control mode information indicating a mode for controlling the vehicle, and wherein setting the driving mode and/or the stop mode comprises:
performing a release mode for corresponding vehicle control, based on the control mode information being a first value,
performing a recommended mode for corresponding vehicle control, based on the control mode information being a second value, and
performing a mandatory mode for corresponding vehicle control, based on the control mode information being a third value.

11. The method of claim 10, further comprising:
determining whether the vehicle is in an auto mode when the recommended mode for corresponding vehicle control is performed, wherein the second V2X communication device performs an operation of the corresponding vehicle control when the vehicle is in the auto mode, and wherein the vehicle control information further includes at least one of eco-driving lifetime information indicating a lifetime of the eco-driving mode or auto-stop lifetime information indicating a lifetime of the auto-stop mode.

12. A second V2X communication device for receiving a V2X message from a first V2X communication device, the second V2X communication device being associated with a vehicle, the second V2X communication device comprising:
a communication unit configured to transmit and receive a communication signal; and
a processor configured to control the communication unit, wherein the processor is configured to:
receive a V2X message from the first V2X communication device, wherein the V2X message includes station type information indicating a type of a station which transmits air pollution information to the first V2X communication device,
determine whether the V2X message also includes vehicle control information, which is based on the air pollution information, for setting a driving mode and/or a stop mode of the vehicle, and
based on a determination that the V2X message includes the vehicle control information, set the driving mode and/or the stop mode based on the vehicle control information, wherein based on the vehicle control information, the driving mode is set to an eco-driving mode and the stop mode is set to an auto-stop mode, wherein the eco-driving mode is a mode for controlling an engine and transmission of the vehicle according to a preset control algorithm to reduce an amount of air pollutants emitted from the vehicle, wherein the auto-stop mode is a mode in which the engine of the vehicle is automatically stopped based on the vehicle stopping for at least a predetermined period of time, wherein the predetermined period of time is a period for which the vehicle is stopped at a stop signal of a traffic light or at a bus stop, wherein the station type information relates to (i) a first type station directly measuring air pollution data or (ii) a second type station using the air pollution data measured by the first type station, and wherein the air pollution information is based on the air pollution data.

13. The second V2X communication device of claim 12, wherein the vehicle control information includes control mode information indicating a mode for controlling the vehicle, and wherein setting the driving mode and/or the stop mode comprises:
performing a release mode for corresponding vehicle control, based on the control mode information being a first value,
performing a recommended mode for corresponding vehicle control, based on the control mode information being a second value, and
performing a mandatory mode for corresponding vehicle control, based on the control mode information being a third value.

14. The second V2X communication device of claim 13, wherein the processor is further configured to:
determine whether the vehicle is in an auto mode when the recommended mode for corresponding vehicle control is performed, wherein the second V2X communication device performs an operation of the corresponding vehicle control when the vehicle is in the auto mode, and wherein the vehicle control information further includes at least one of eco-driving lifetime information indicating a lifetime of the eco-driving mode or auto-stop lifetime information indicating a lifetime of the auto-stop mode.

* * * * *